(12) United States Patent
Weissmann et al.

(10) Patent No.: US 10,379,596 B2
(45) Date of Patent: Aug. 13, 2019

(54) PROVIDING AN INTERFACE FOR DEMOTION CONTROL INFORMATION IN A PROCESSOR

(71) Applicant: Intel Corporation, Santa Clara, CA (US)

(72) Inventors: Eliezer Weissmann, Haifa (IL); Nir Rosenzweig, Givat Ella (IL); Efraim Rotem, Haifa (IL); Yoav Ben-Raphael, Haifa (IL); Alon Naveh, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 15/227,040

(22) Filed: Aug. 3, 2016

(65) Prior Publication Data

US 2018/0039322 A1 Feb. 8, 2018

(51) Int. Cl.
*G06F 1/3206* (2019.01)
*G06F 1/3287* (2019.01)
*G06F 1/3296* (2019.01)

(52) U.S. Cl.
CPC .......... *G06F 1/3287* (2013.01); *G06F 1/3206* (2013.01); *G06F 1/3296* (2013.01); *Y02D 10/171* (2018.01); *Y02D 10/172* (2018.01); *Y02D 50/20* (2018.01)

(58) Field of Classification Search
CPC .............................. G06F 1/3246; G06F 1/3287
See application file for complete search history.

(56) References Cited

U.S. PATENT DOCUMENTS

| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |

(Continued)

FOREIGN PATENT DOCUMENTS

EP 1 282 030 A1 5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Terrell S Johnson
(74) *Attorney, Agent, or Firm* — Trop, Pruner & Hu, P.C.

(57) ABSTRACT

In one embodiment, a processor includes: a plurality of cores; a power controller including a logic to autonomously demote a first request for at least one core of the plurality of cores to enter a first low power state, to cause the at least one core to enter a second low power state, the first low power state a deeper low power state than the second low power state; and an interface to receive an input from a system software, the input including at least one demotion control parameter, where the logic is to autonomously demote the first request based at least in part on the at least one demotion control parameter. Other embodiments are described and claimed.

18 Claims, 24 Drawing Sheets

(56) References Cited

U.S. PATENT DOCUMENTS

| | | |
|---|---|---|
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 8,799,687 B2 | 8/2014 | Naveh et al. |
| 8,996,895 B2 | 3/2015 | Naveh et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newbum |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0058078 A1* | 3/2010 | Branover ............... G06F 1/3203 713/300 |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0078478 A1* | 3/2011 | Branover ............... G06F 1/3203 713/323 |
| 2011/0154090 A1 | 6/2011 | Dixon et al. |
| 2011/0179295 A1 | 7/2011 | Jahagirdar et al. |
| 2012/0079290 A1 | 3/2012 | Kumar |
| 2012/0191995 A1* | 7/2012 | Naveh .................. G06F 1/3203 713/320 |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0068290 A1 | 3/2014 | Bhandaru et al. |
| 2014/0195829 A1 | 7/2014 | Bhandaru et al. |
| 2014/0208141 A1 | 7/2014 | Bhandaru et al. |
| 2014/0317430 A1 | 10/2014 | Naveh et al. |
| 2015/0277528 A1 | 10/2015 | Knight et al. |

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

Intel Corporation, "Intel 64 and IA-32 Architectures Software Developer's Manual," vol. 3B: System Programming Guide, Part 2, Apr. 2016, Chapter 14 Power and Thermal Management (14.1-14.9.5), 42 pages.

International Searching Authority, "Notification of Transmittal of the International Search Report and the Written Opinion of the International Searching Authority," dated Nov. 2, 2017, in International application No. PCT/US2017/042999.

* cited by examiner

PROVIDING AN INTERFACE FOR DEMOTION CONTROL INFORMATION IN A PROCESSOR

FIELD OF THE INVENTION

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
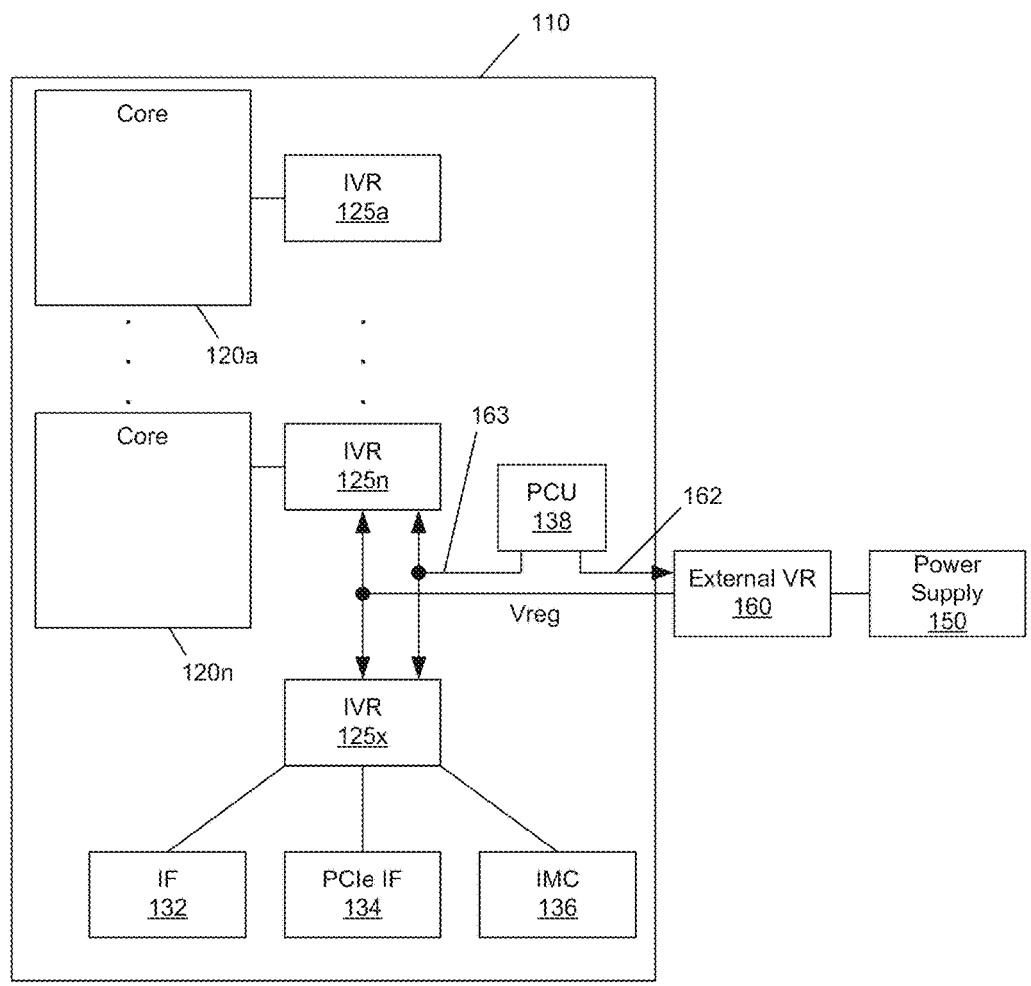
FIG. 1 is a block diagram of a portion of a system in accordance with an embodiment of the present invention.

In various embodiments, a processor may be configured with an interface to receive and use customer tunings for at least certain power management control parameters. More particularly, embodiments provide interface techniques to receive and use demotion control parameters. That is, processors may be configured with a so-called auto-demotion feature, which is an autonomous control technique in which operating system (OS) power state control is overruled by a power controller (including power management firmware) of the processor. While such autonomous processor control is tuned for given products, there can be several limitations, including: power management algorithms that are highly dependent on particular product and workload; an OS may have certain configurable configuration files that are not available; and certain customers that want to spend research and development effort to tune their specific usages cannot have access, without using an embodiment. Embodiments thus provide an external interface, an internal communication interface to firmware and power management hardware, and externally tunable control algorithms to enable improved tunings for at least certain power management features.

When a processor enters a deeper idle state, it saves power. On the other hand, such deep low power state introduces performance degradation (due to entry and exit latency, loss of core architectural information like its cache, translation lookaside buffer (TLB), branch target buffer (BTB), etc.). Deep low power state transitions also consume energy to save and restore state. With the overall desire for energy savings, running longer at a given power due to performance degradation increases energy consumption. This effect, together with the save/restore energy cost, may cost more energy than the energy saved by the low power state. Thus greater numbers of low power state transitions (generally Cx transitions herein) cause higher energy costs and higher performance impact. There is a breakeven point at which entering a given Cx state results in energy lost. This breakeven point is dependent on workload characteristics (e.g., performance degradation, cache foot print, application ratio, Cx entry/exit profile etc.). Often workload behavior is characterized by bursts of high transition rate that exceed the breakeven threshold. As such, there is no "one setting fits all" approach. Embodiments herein enable customer-based tuning to increase power savings and/or performance.

In various embodiments, an external basic input/output system (BIOS)/OS interface is provided, along with an internal communication interface from that interface to power control circuitry (including but not limited to firmware and hardware state machines) to enable externally tunable control algorithms. In embodiments, the external interface enables an original equipment manufacturer (OEM) or operating system vendor (OSV) to provide control parameters by way of machine specific register (MSR), memory mapped input/output (MMIO) or mailbox interface to enable direct access to the power control circuitry for performing auto-demotion.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage Vreg to processor 110.

As seen, processor 110 may be a single die processor including multiple cores 120a-120n. In addition, each core may be associated with an integrated voltage regulator (IVR) 125a-125n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 120 may include or be associated with independent clock generation circuitry such as one or more phase lock loops (PLLs) to control operating frequency of each core 120 independently.

Still referring to FIG. 1, additional components may be present within the processor including an input/output interface (IF) 132, another interface 134, and an integrated memory controller (IMC) 136. As seen, each of these components may be powered by another integrated voltage regulator $125_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include circuitry including hardware, software and/or firmware to perform power management operations with regard to processor 110. As seen, PCU 138 provides control information to external voltage regulator 160 via a digital interface 162 to cause the voltage regulator to generate the appropriate regulated voltage. PCU 138 also provides control information to IVRs 125 via another digital interface 163 to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). PCU 138 may be configured to override power management requests initiated by system software (such as an OS and/or a BIOS), to enable improved performance when a large number of low power state interrupting events is received that cause undesired exits from a given low power state. And furthermore, PCU 138 may control this demotion operation based at least in part on customer-provided information received via an interface as provided herein.

In FIG. 1, PCU 138 is illustrated as being present as a separate logic of the processor. In other cases PCU logic 138 may execute on a given one or more of cores 120. In some cases, PCU 138 may be implemented as a microcontroller (dedicated or general-purpose) or other control logic configured to execute its own dedicated power management code, sometimes referred to as P-code. In yet other embodiments, power management operations to be performed by PCU 138 may be implemented externally to a processor, such as by way of a separate power management integrated circuit (PMIC) or other component external to the processor. In yet other embodiments, power management operations to be performed by PCU 138 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. For example, other regulated voltages may be provided to on-chip resources from external voltage regulator 160 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). Note that using the demotion-based techniques herein, C-state requests from the OS can be overridden, based at least in part on customer tuning information provided via an interface as described herein.

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 2:
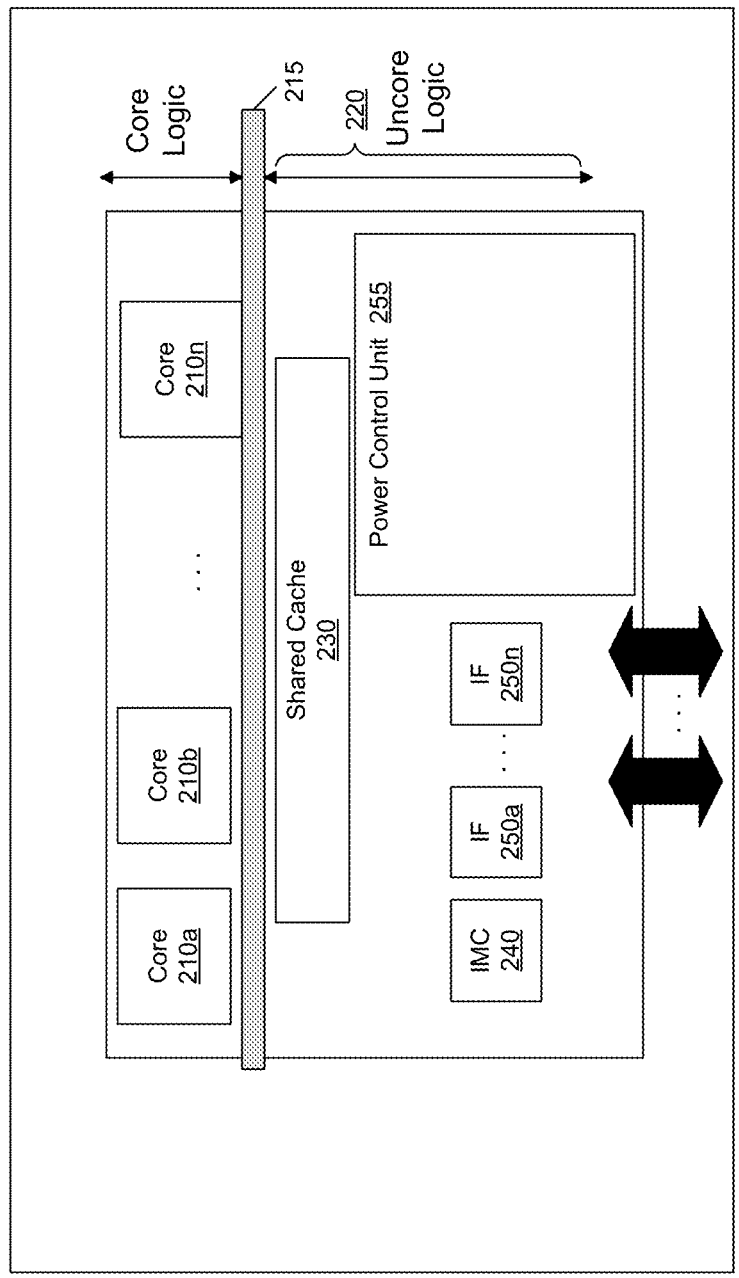
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. One or more cores 210 may be heterogeneous to the other cores, e.g., having different micro-architectures, instruction set architectures, pipeline depths, power and performance capabilities. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform power management techniques, including auto-demotion techniques controlled based at least in part on customer-provided tuning as described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
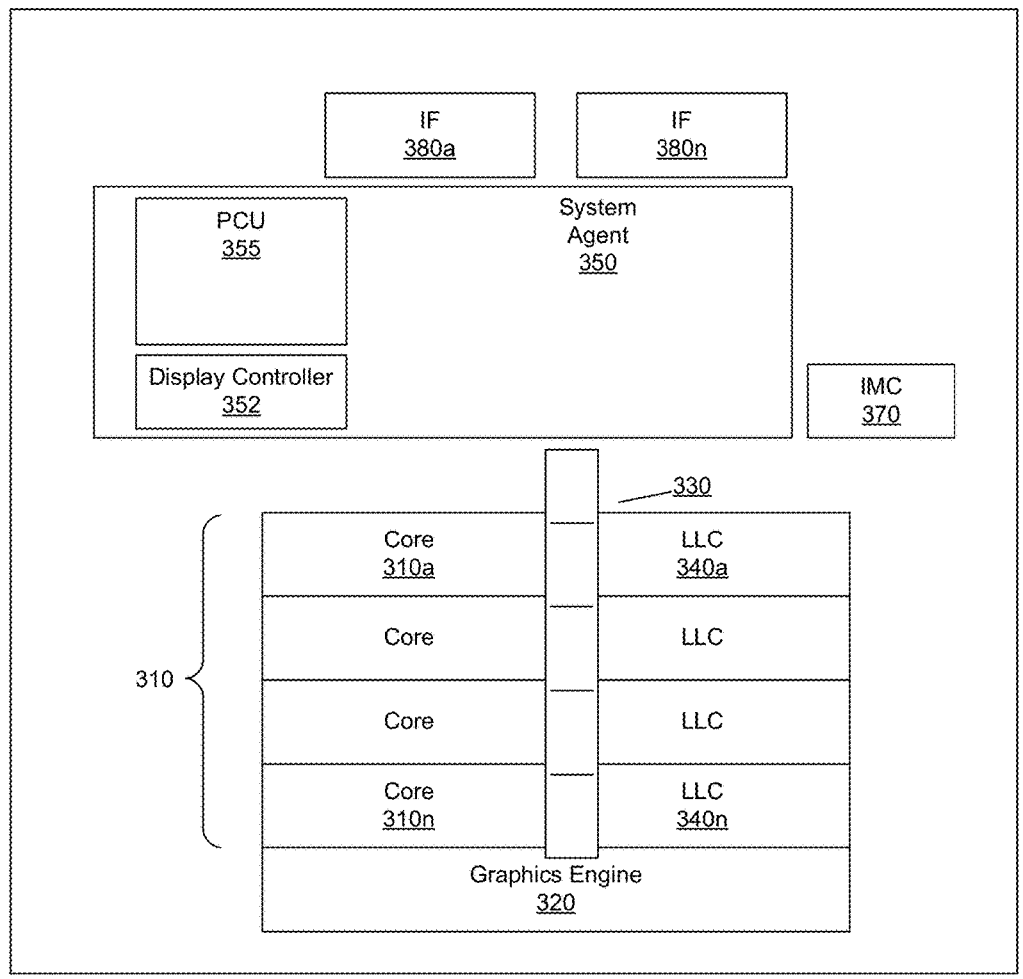
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores 310a-310n, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) 340a-340n. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform power management techniques, including the customer controllable auto-demotion techniques described herein.

As further seen in FIG. 3, processor 300 can further include an integrated memory controller (IMC) 370 that can provide for an interface to a system memory, such as a dynamic random access memory (DRAM). Multiple interfaces 380a-380n may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
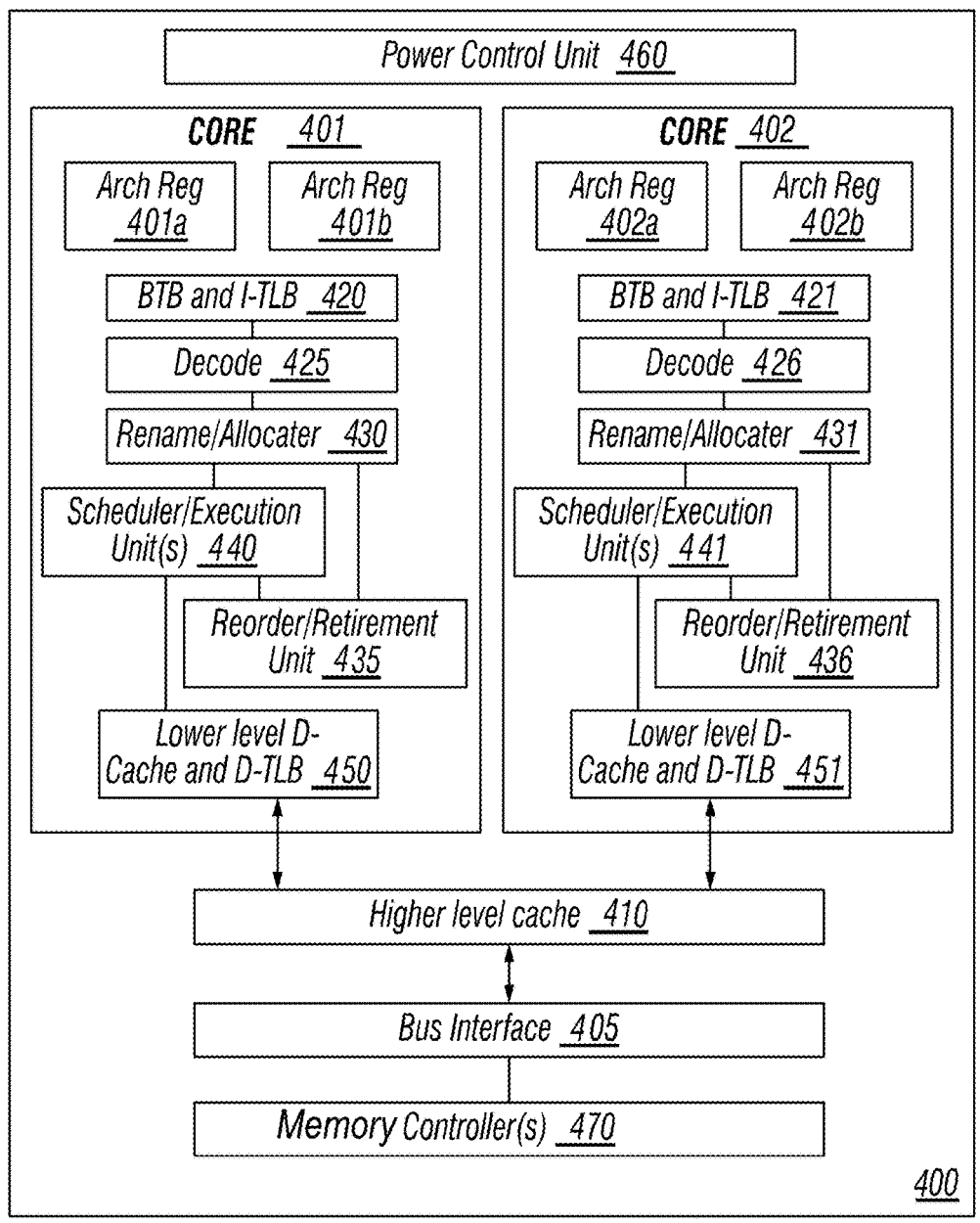
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, branch target buffer and instruction translation lookaside buffer (BTB and I-TLB) 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to a fetch unit to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power control unit 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
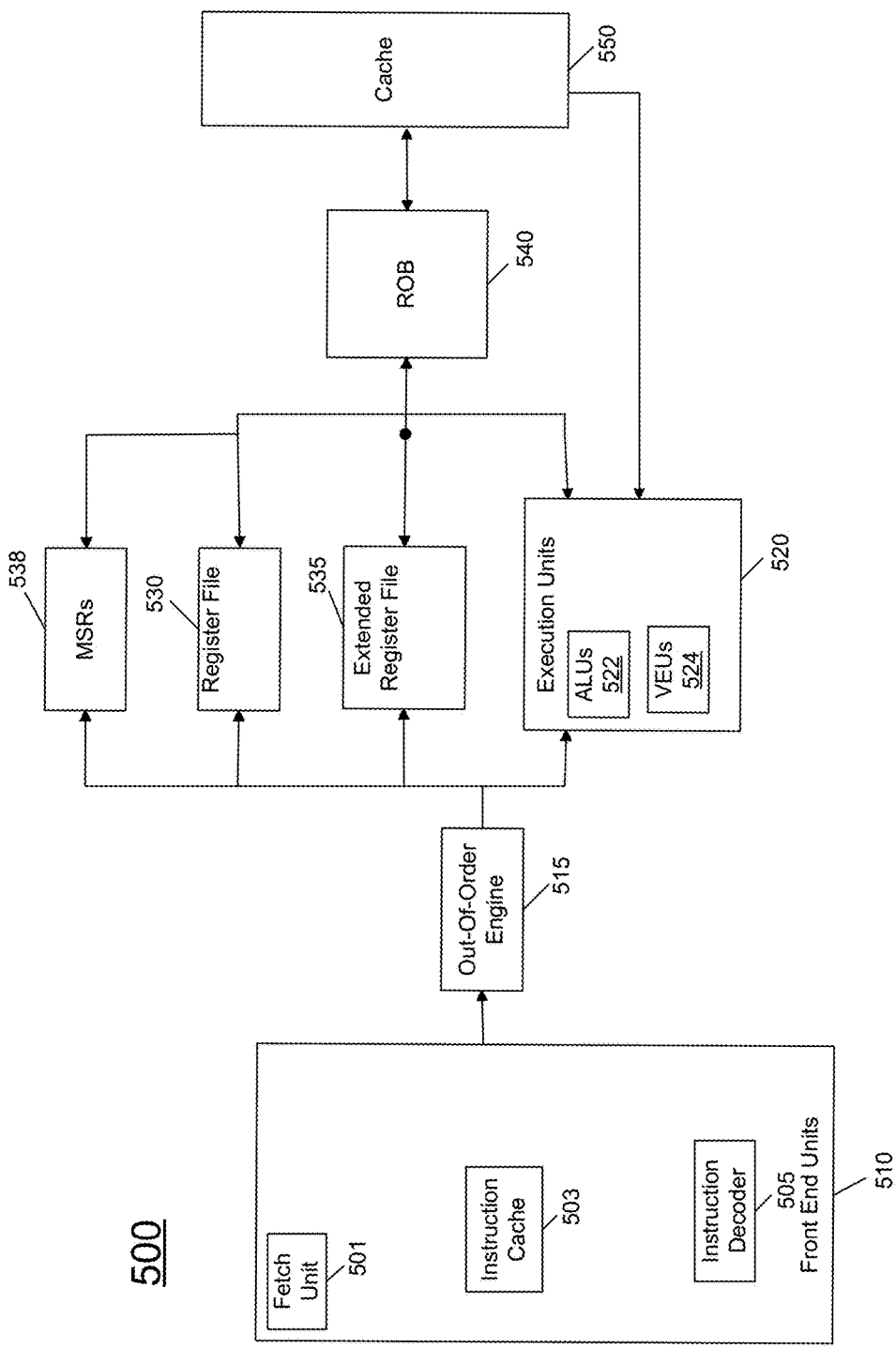
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
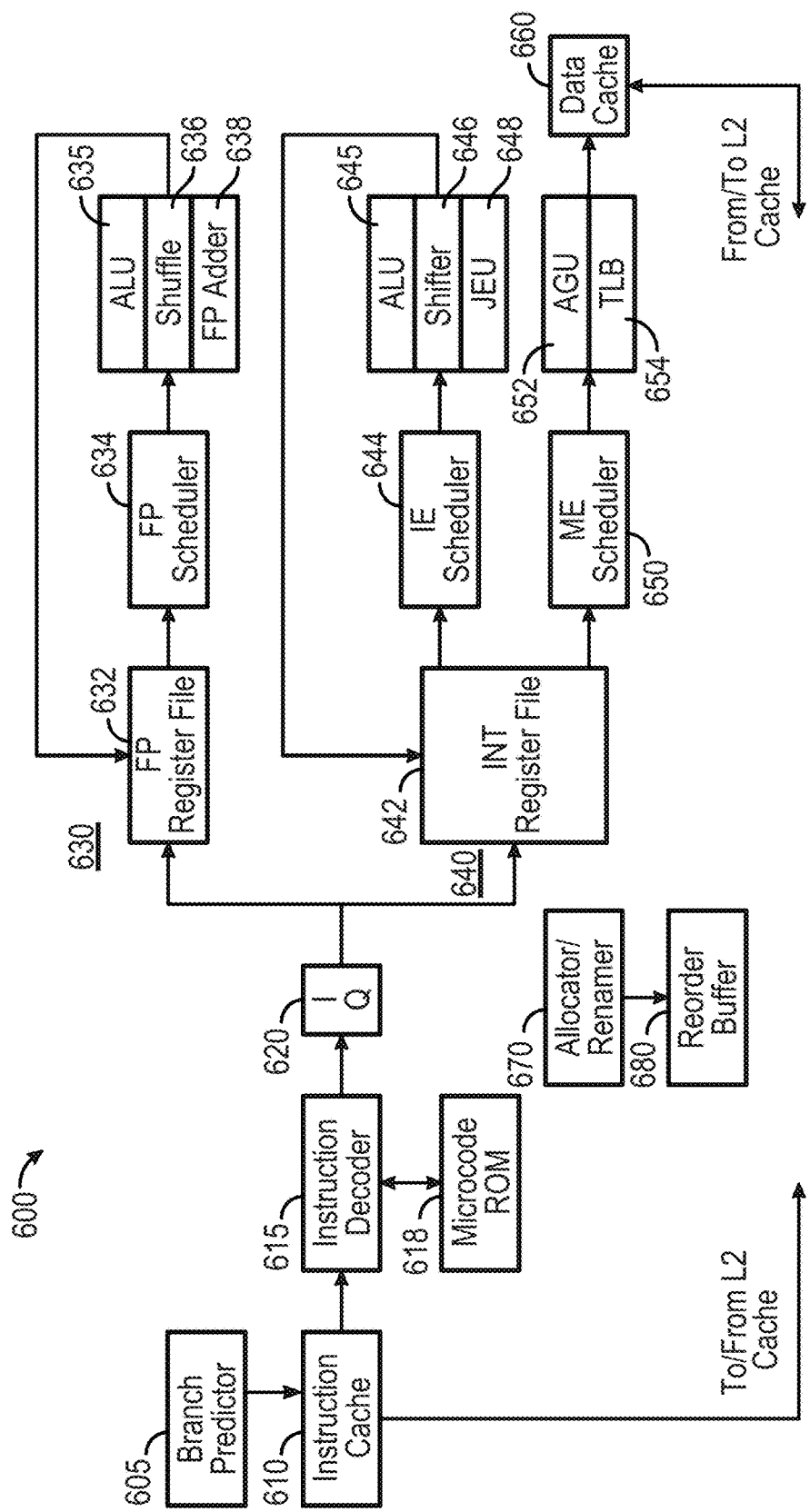
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue (IQ) 620 for storage and delivery to a given execution pipeline. A microcode ROM 618 is coupled to instruction decoder 615.

A floating point pipeline 630 includes a floating point (FP) register file 632 which may include a plurality of architectural registers of a given bit width such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer (INT) register file 642 which may include a plurality of architectural registers of a given bit width such as 128 or 256 bits. Pipeline 640 includes an integer execution (IE) scheduler 644 to schedule instructions for execution on one of multiple execution units of the pipeline. In the embodiment shown, such execution units include an ALU 645, a shifter unit 646, and a jump execution unit (JEU) 648. In turn, results generated in these execution units may be provided back to buffers and/or registers of register file 642. Of course understand while shown with these few example execution units, additional or different integer execution units may be present in another embodiment.

A memory execution (ME) scheduler 650 may schedule memory operations for execution in an address generation unit (AGU) 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
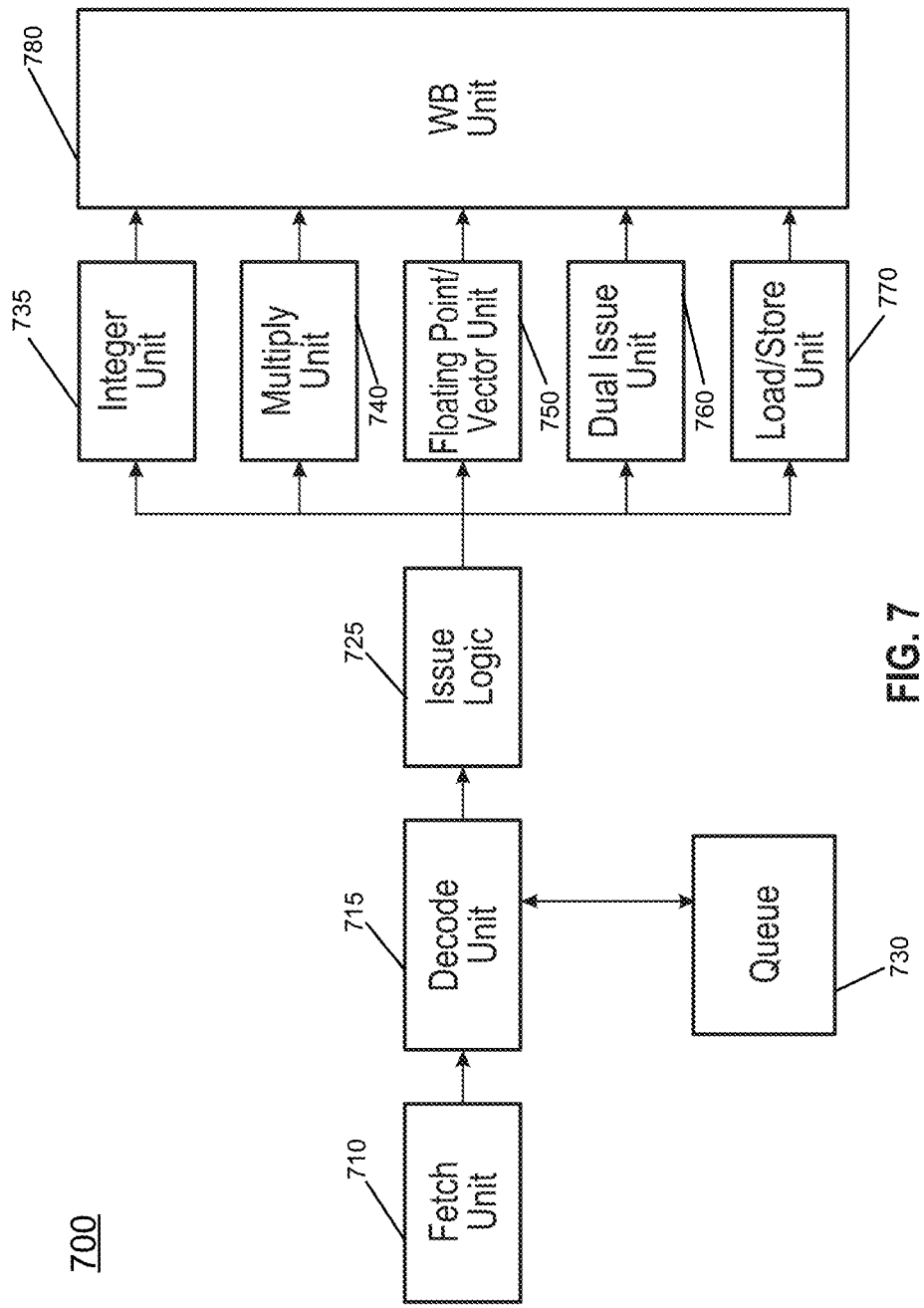
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback (WB) unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
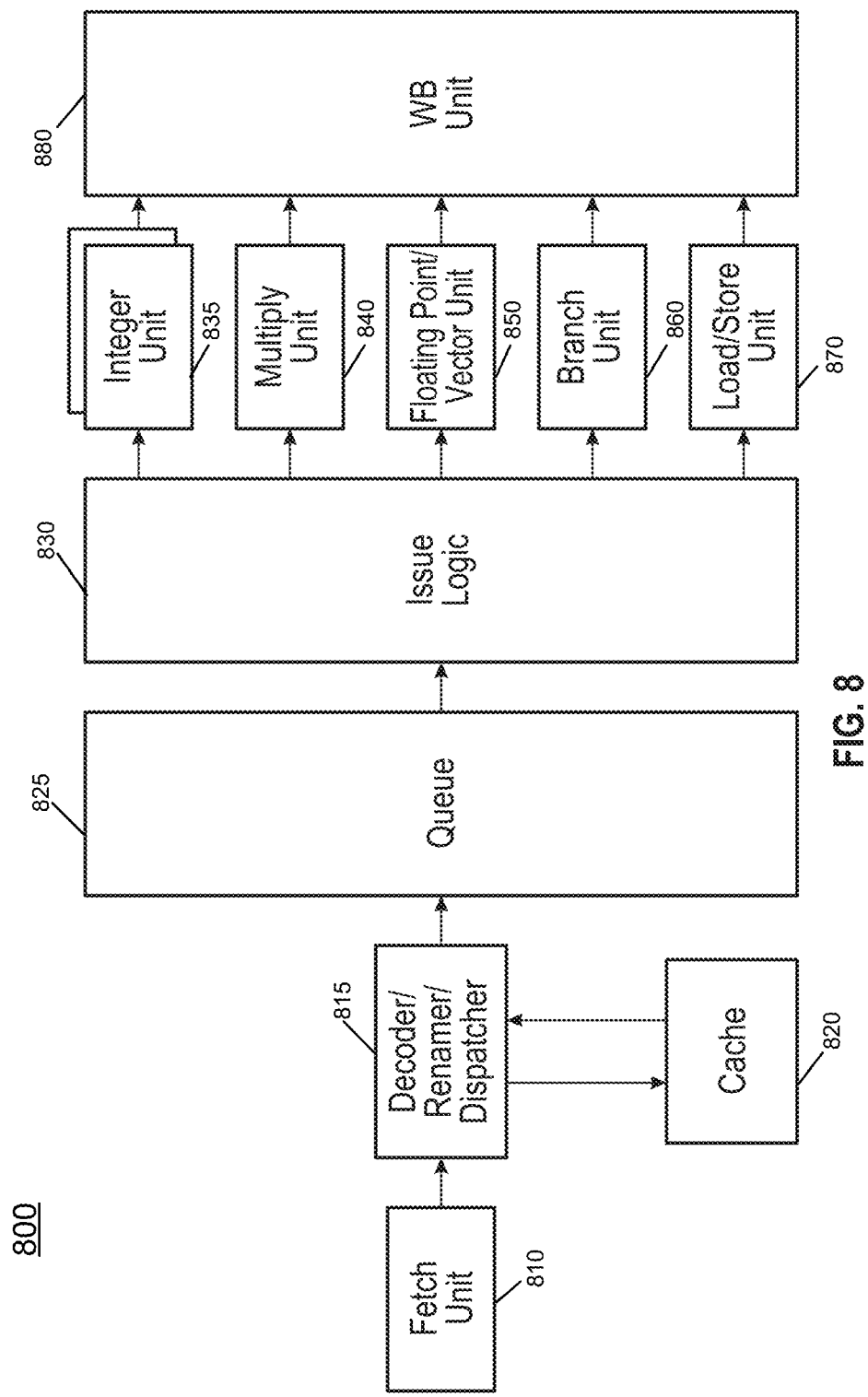
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher unit 815 coupled to a cache 820. Unit 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
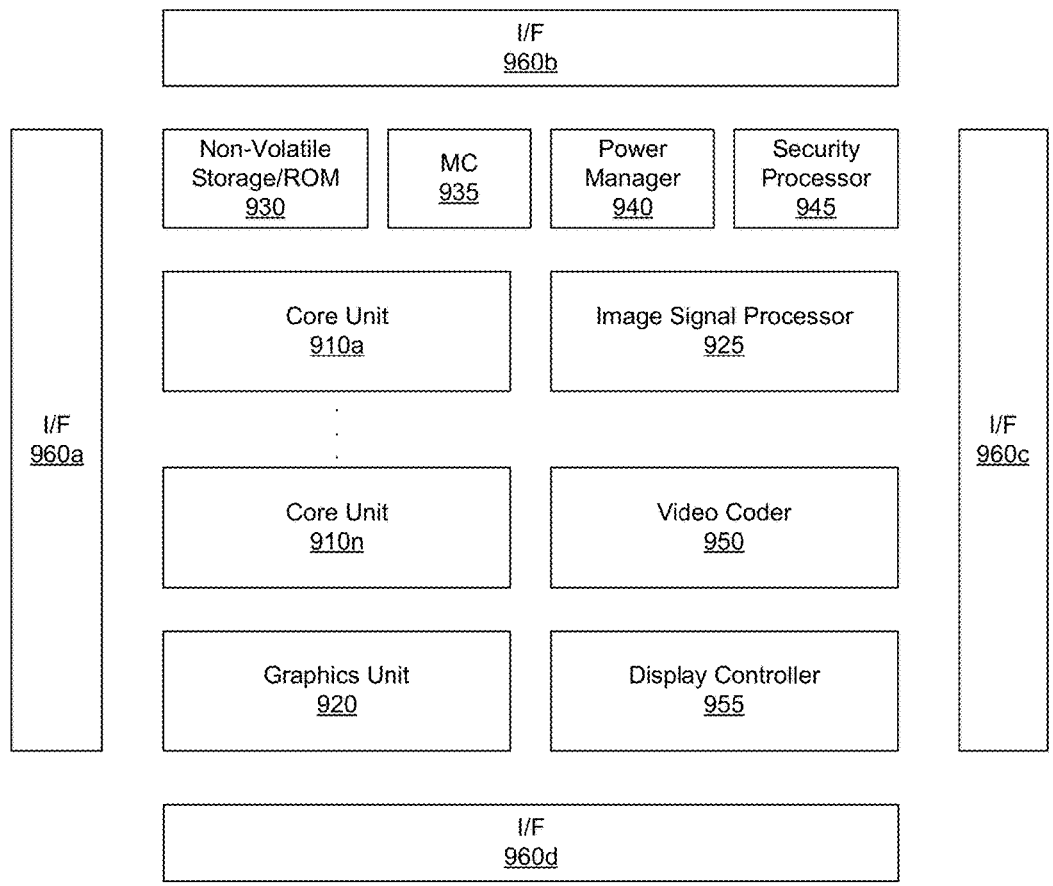
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 9, processor 900 includes a plurality of core units 910a-910n. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
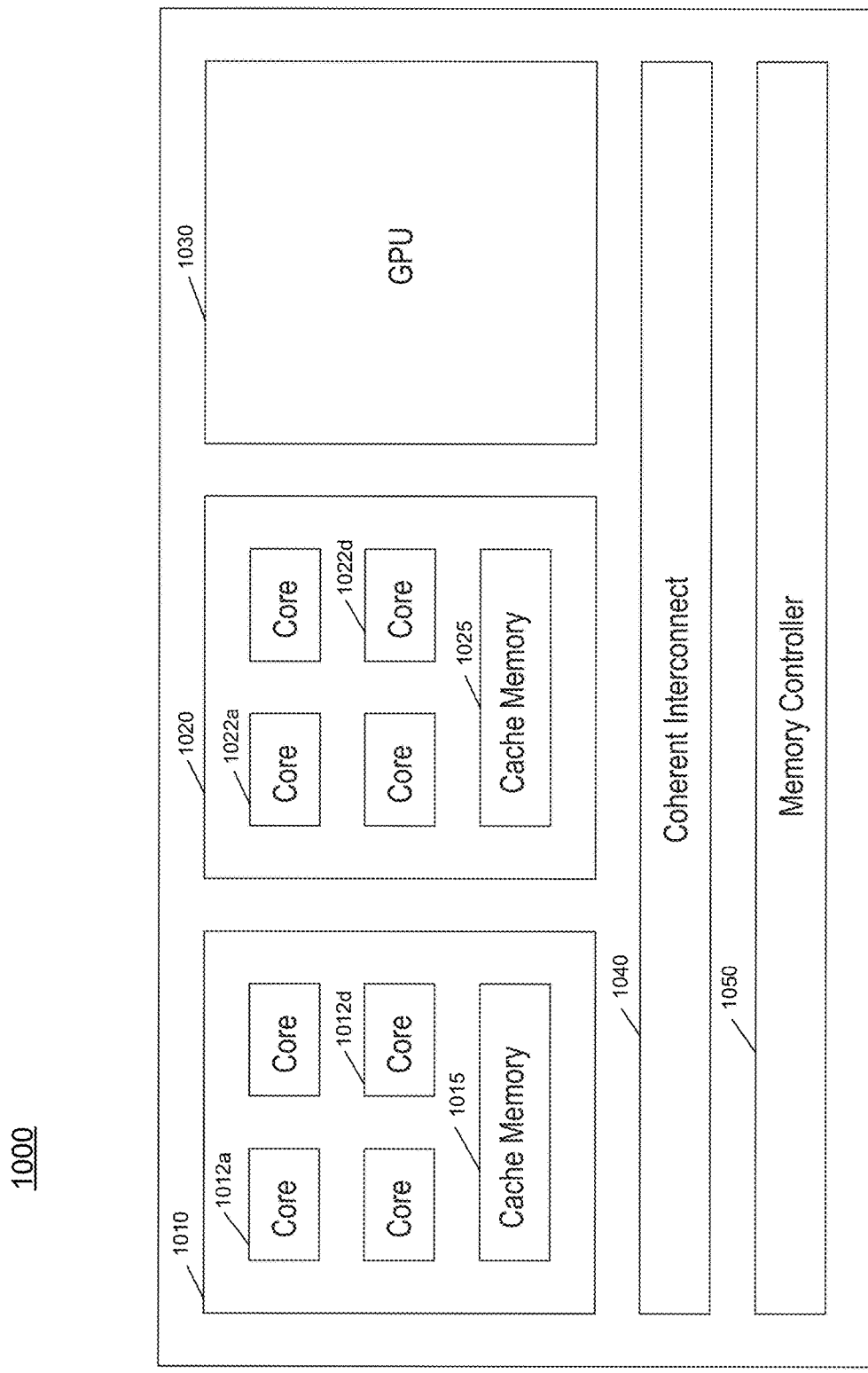
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012a-1012d. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022a-1022d. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
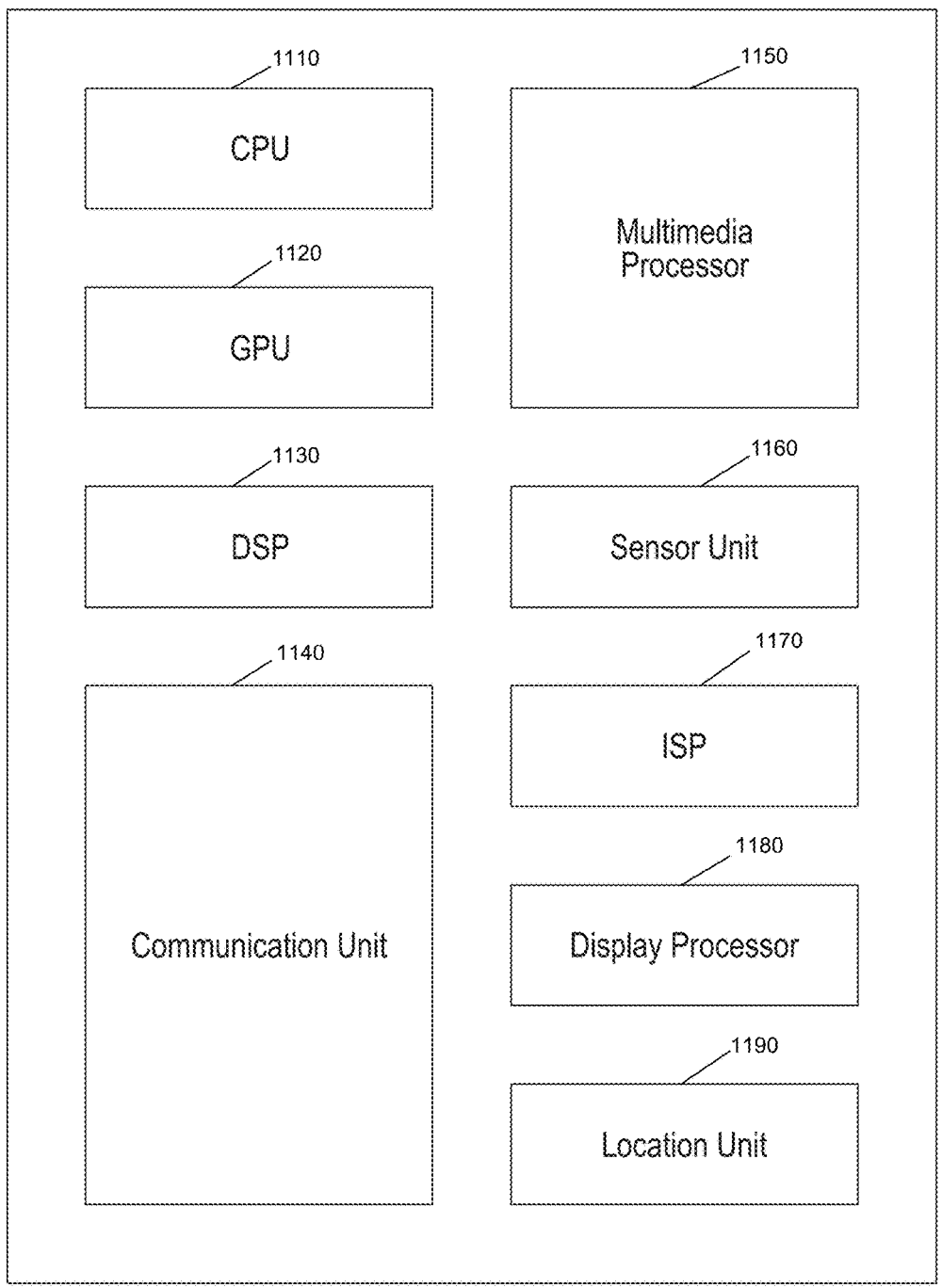
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver.

Understand that while shown with this particular set of components in the example of FIG. 11, many variations and alternatives are possible.

Figure 12:
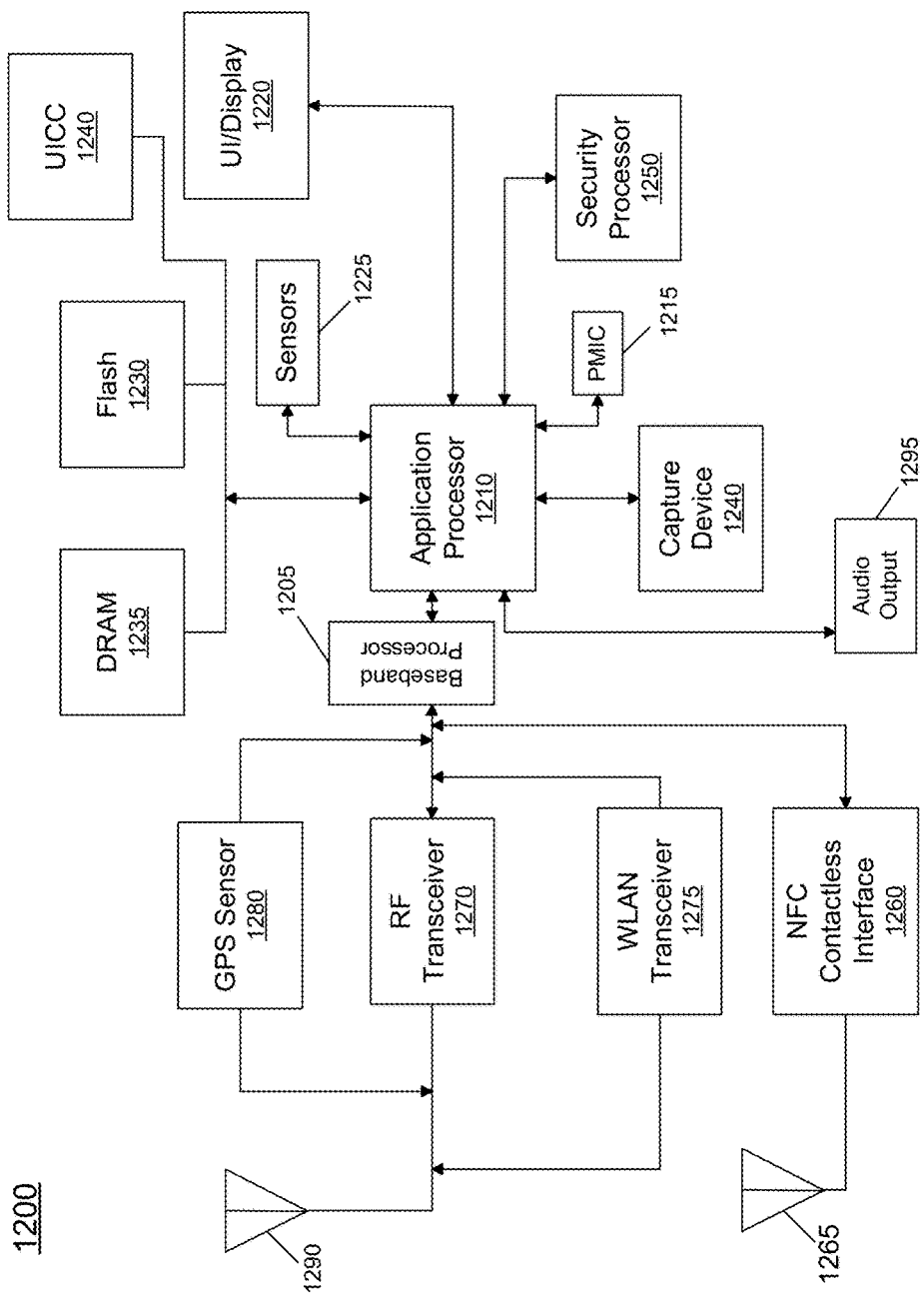
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
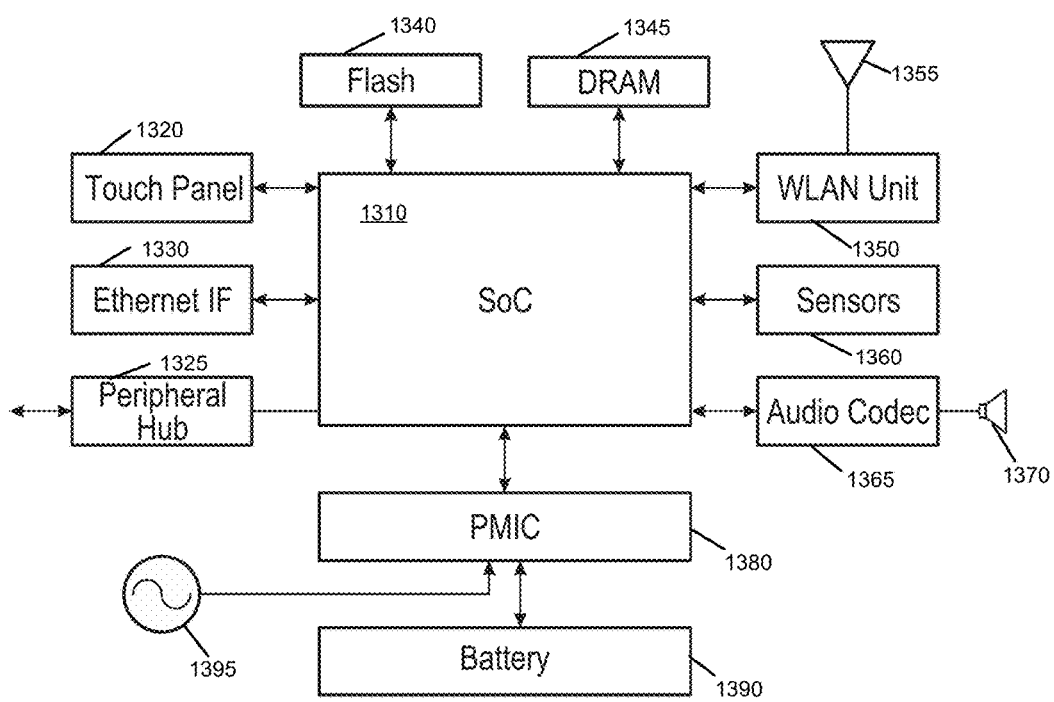
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
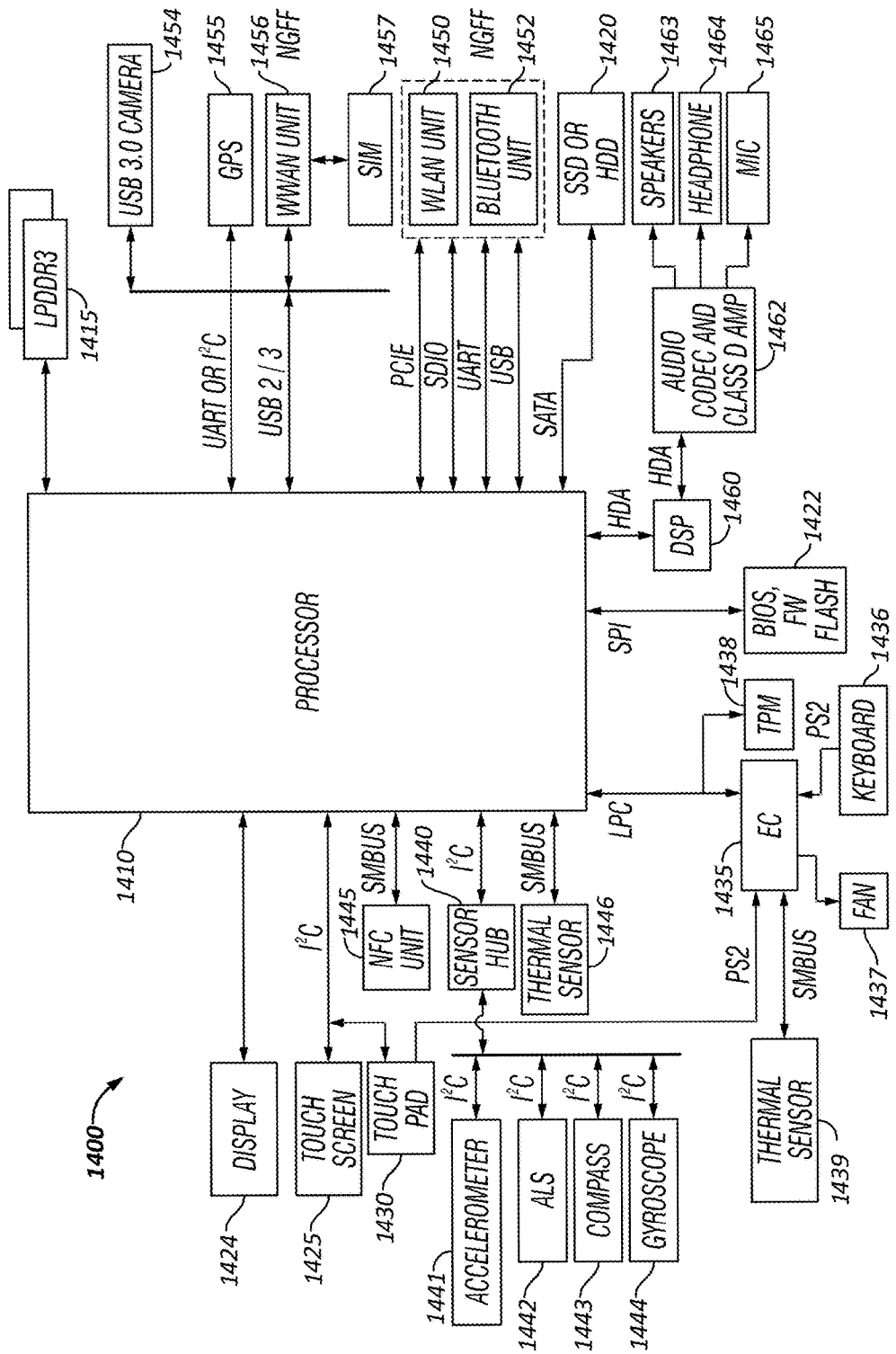
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
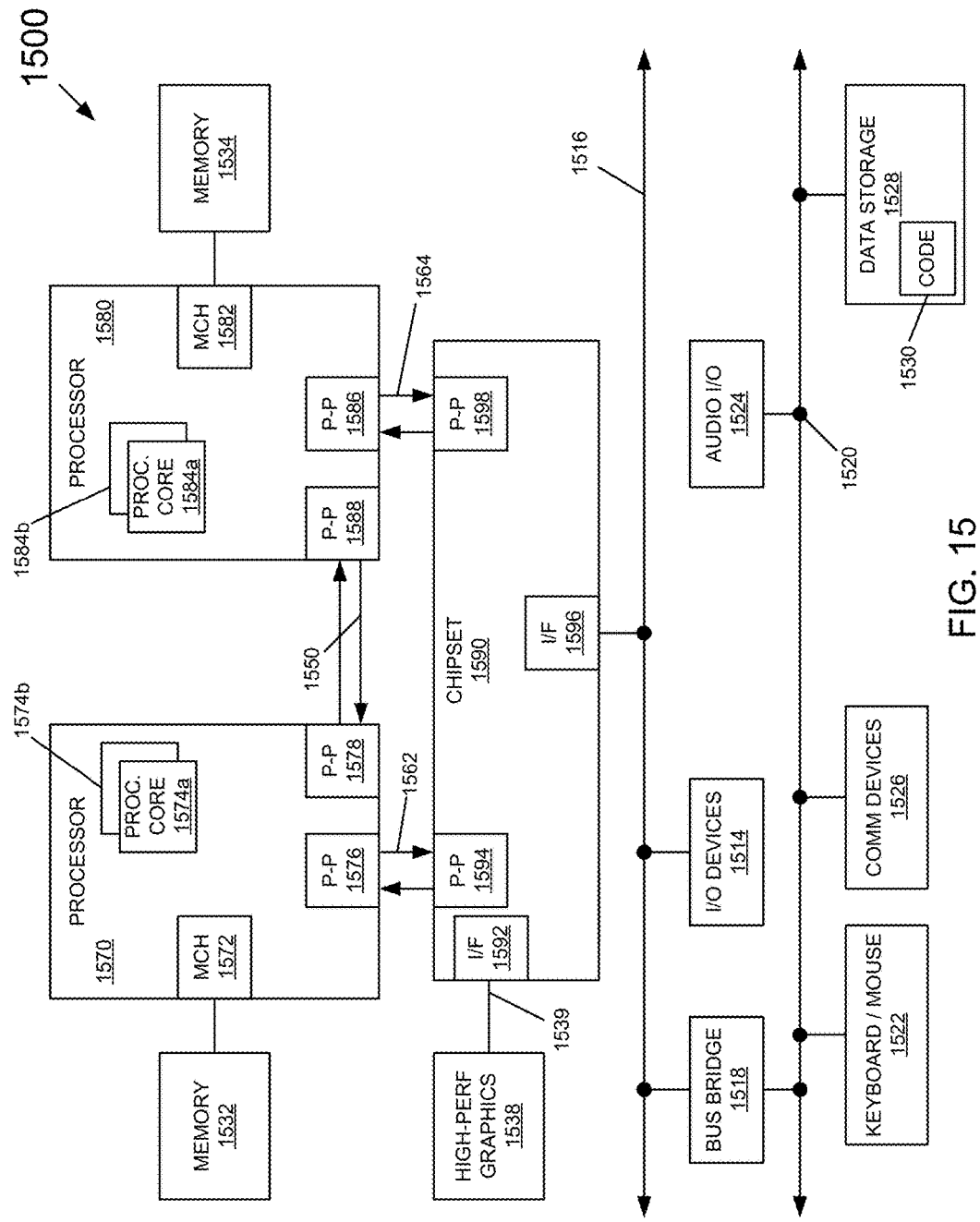
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management, including the auto-demotion techniques using customer provided tuning information, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
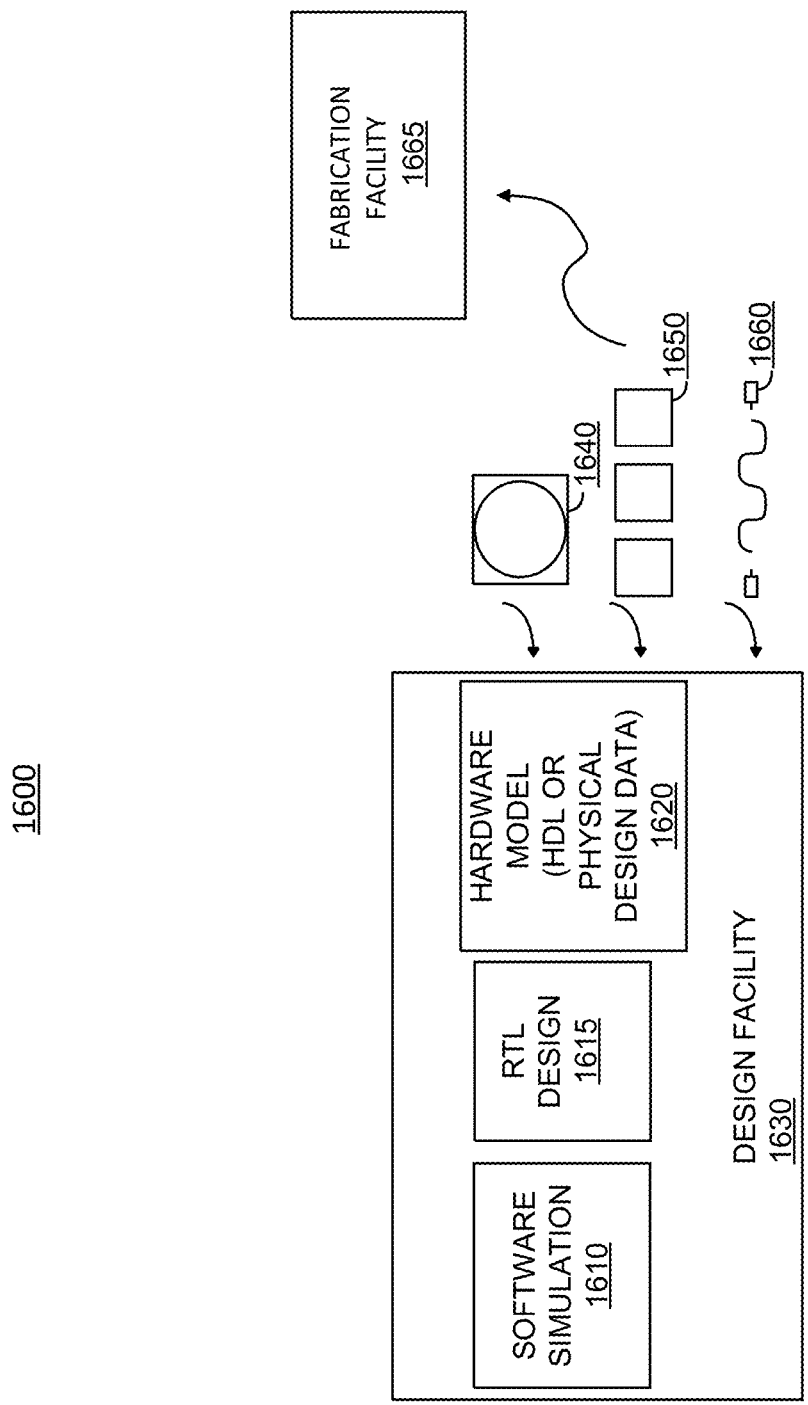
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, reusable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

In embodiments, auto-demotion flow control occurs when an OS request for a C6 or C3 state is to be autonomously overruled by power control circuitry and instead be demoted to a shallower low power state (e.g., a C1 state instead of the C3 request or a C1 or C3 state instead of the C6 request). This autonomous flow control also controls when a current demotion to C1 or C3 can be "un-demoted" back to the original OS target C-state, C3 or C6. This control flow seeks to identify a burst of idle state break events and in case of frequent breaks events, demotion control is activated. Conversely, un-demotion occurs if, after a demotion event, the number of breaks from idle state was much lower than the level that caused the demotion. Embodiments of the control techniques may also ignore old history of bursts of idle breaks in order to avoid demotion when it is no longer appropriate.

Note that un-demotion can occur with or without OS assist and enable the original target C-state. With an OS assist, the hardware creates a surprise break back into an active state, with the assumption that there is no pending work and the OS will re-enter immediately into the idle state. Without assist by the OS, the processor hardware may enable the promotion from C1 or C3 to C3 or C6 without wakeup of the OS.

In embodiments, the demotion control may be based at least in part on a demotion counter per core per target of demotion state. In an embodiment, a break event causes a decrement to a given counter (up to some defined maximal value). The control of the level of breaks per time interval (e.g., number of breaks per second (breaks/sec)) that generates a demotion event, amount of breaks/sec that enables an un-demotion event and/or a history cleanup, may be controlled by the slope of demotion's counter cleanup as a function of time. That is, for a given period of time, the demotion counter is incremented by a constant value (e.g., by one). As the period of time is reduced, the number of breaks/sec that can create a demotion may be higher, and un-demotion occurs faster and the history is cleared quite soon after a break event burst.

For longer periods of time, when the demotion counter is incremented, it will have the opposite effect and the amount of breaks/sec that can generate a demotion event can be lower, and the un-demotion event that occurs after a break burst event and the history forgetting of break events takes more time. In embodiments, different values of time for different idle states can be used to increment the counter while the processor is in a demotion event (for un-demotion case), or a single slope value can be used for all different idle sates.

Based on customer control parameters, the option to control demotion flow either from C6 or C3 to C1 or from C3 to C1 (for example) may be based at least in part on the amount of time at which the demotion counter is incremented. In this way, the level of idle breaks/sec that creates demotion, un-demotion and the history clearing can be controlled by the software and re-tuned by OEM or OSV to override generic settings of this slope value set by a processor manufacturer. Note that in different embodiments, this slope value (and other demotion control parameters) can be either defined as a single value, or each power state (C0, C1, etc.) can be tuned differently.

Figure 17:
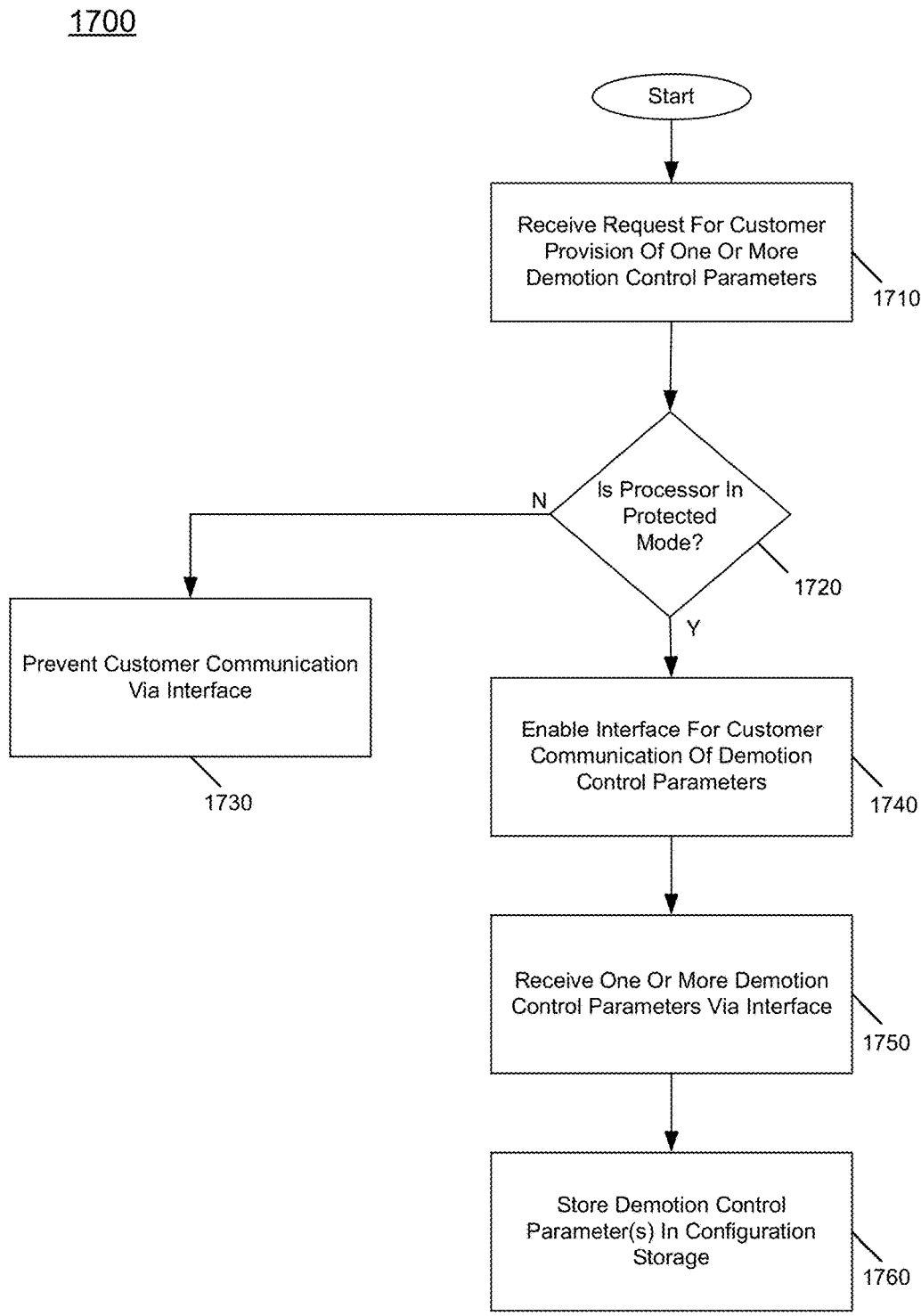
FIG. 17 is a flow diagram of a method in accordance with one embodiment of the present invention.

Referring now to FIG. 17, shown is a flow diagram of a method in accordance with one embodiment of the present invention. More specifically, method 1700 of FIG. 17 is a method for providing a customer interface to enable particular demotion control parameters to be provided from a customer such as an OEM or OSV, via an interaction with given system software such as an OS or BIOS. In one embodiment, method 1700 may be performed by appropriate combinations of hardware, software, and/or firmware, such as hardware power control circuitry, which itself may be implemented as one or more microcontrollers or other hardware control logic.

As illustrated, method 1700 begins by receiving a request for customer provision of one or more demotion control parameters (block 1710). As an example, the request may be received via one or more of OEM BIOS, OSV OS routines, or in another manner. Next it is determined whether the processor is in a protected mode (diamond 1720). Understand that this protected mode determination may be that a given OS or BIOS has control of the processor and thus is operating in a privileged mode (e.g., ring 0). In other cases, this determination of protected mode may be optional. If it is determined that the processor is not in an appropriate protected mode, control passes to block 1730 where customer communication via this interface may be prevented, in embodiments where this optional security check is performed.

Otherwise, control passes to block 1740 where the interface may be enabled for customer communication of demotion control parameters. Understand that this interface may take different forms, including at least one of a general-purpose mailbox interface, one or more MSRs, MMIOs or so forth. Next at block 1750 one or more demotion control parameters may be received via this interface. Understand that these demotion control parameters may be customer-tuned values. As described herein, in different embodiments a customer may provide tuned values for one or more of multiple demotion thresholds, a slope parameter, among potentially other such parameters. Thereafter at block 1760 these one or more demotion control parameters can be stored in a configuration storage. In one embodiment, this configuration storage may be present within or associated with a PCU, and may be a given non-volatile storage. In other cases, these values may be stored in MSRs, MMIOs or other configuration registers. Understand while shown at this high level in the embodiment of FIG. 17, many variations and alternatives are possible.

Figure 18:
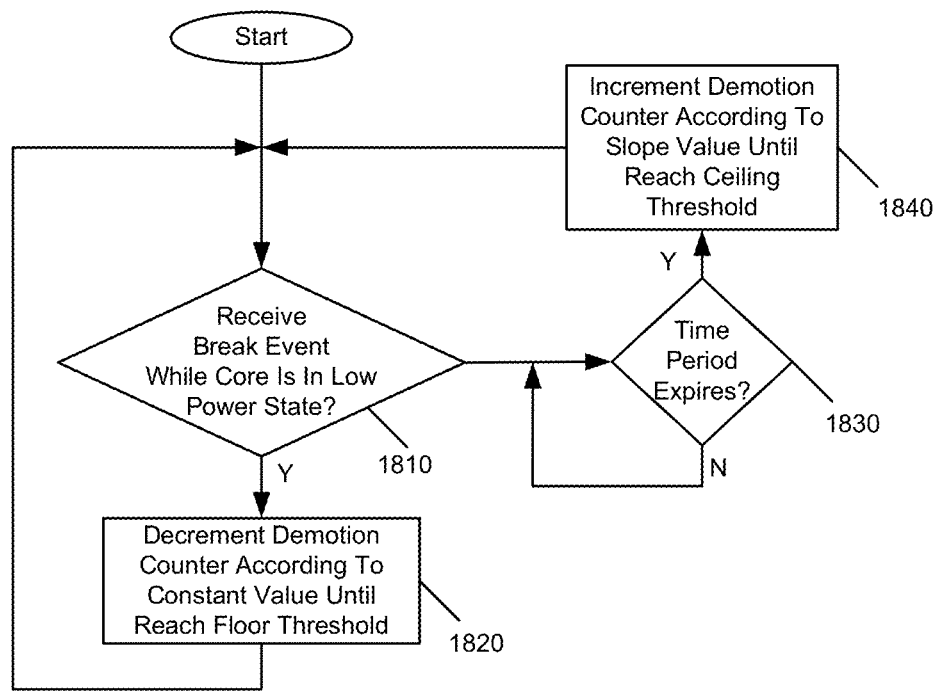
FIG. 18 is a flow diagram of a method in accordance with another embodiment of the present invention.

Referring now to FIG. 18, shown is a flow diagram of a method in accordance with another embodiment of the present invention. As shown in FIG. 18, method 1800 may be performed by, e.g., hardware power control circuitry, to update one or more demotion counters based at least in part on the customer-provided demotion control parameters. As illustrated, method 1800 begins by determining whether a break event is received while at least one core is in a low power state (diamond 1810). If so, control passes to block 1820 where a demotion counter may be decremented. Understand that this demotion counter may be one of a plurality of such demotion counters, in which each demotion counter may be associated with a particular thread, low power state, core or any combination thereof. More specifically, in block 1820 this demotion counter may be decremented according to a constant value and may be performed, so long as the value of the demotion counter is not at a floor threshold value (which in one embodiment may be a demotion control parameter possibly provided by the customer). As one example, this decrement may be by a constant value of 1, although other constant values are possible. Furthermore, understand that while in method 1800 the convention is for a decrement responsive to receipt of a break event while in a given low power state, in other embodiments another type of update to the demotion counter, such as an increment or so forth instead may be performed.

Still referring to FIG. 18, if instead no break event is determined to have been received, control passes to diamond 1830 to determine whether a given time period has expired (diamond 1830). Understand that this time period may be a given duration of low power state residency, e.g., 10 microseconds (μs). Note that this duration of idle time also may be a demotion control parameter possibly provided by the customer. If such time period has been determined to have expired, control passes to block 1840 where the demotion counter may be incremented. In the embodiment of FIG. 18, this increment may be according to a slope value, which may be a customer-provided demotion control parameter. As examples, a customer may choose to control aggressiveness of demotion operation in a manner to favor higher performance by limiting demotion operation to situations only when an excessive amount of incoming break events is received. In such cases then, this slope parameter may be set at a relatively high level (e.g., between approximately 200-250 μsec corresponding to 5000 to 4000 breaks per second) to cause the demotion counter to quickly or aggressively reach its ceiling threshold (such that an un-demotion occurs). Understand while shown at this high level in the embodiment of FIG. 18, many variations and alternatives are possible.

Figure 19:
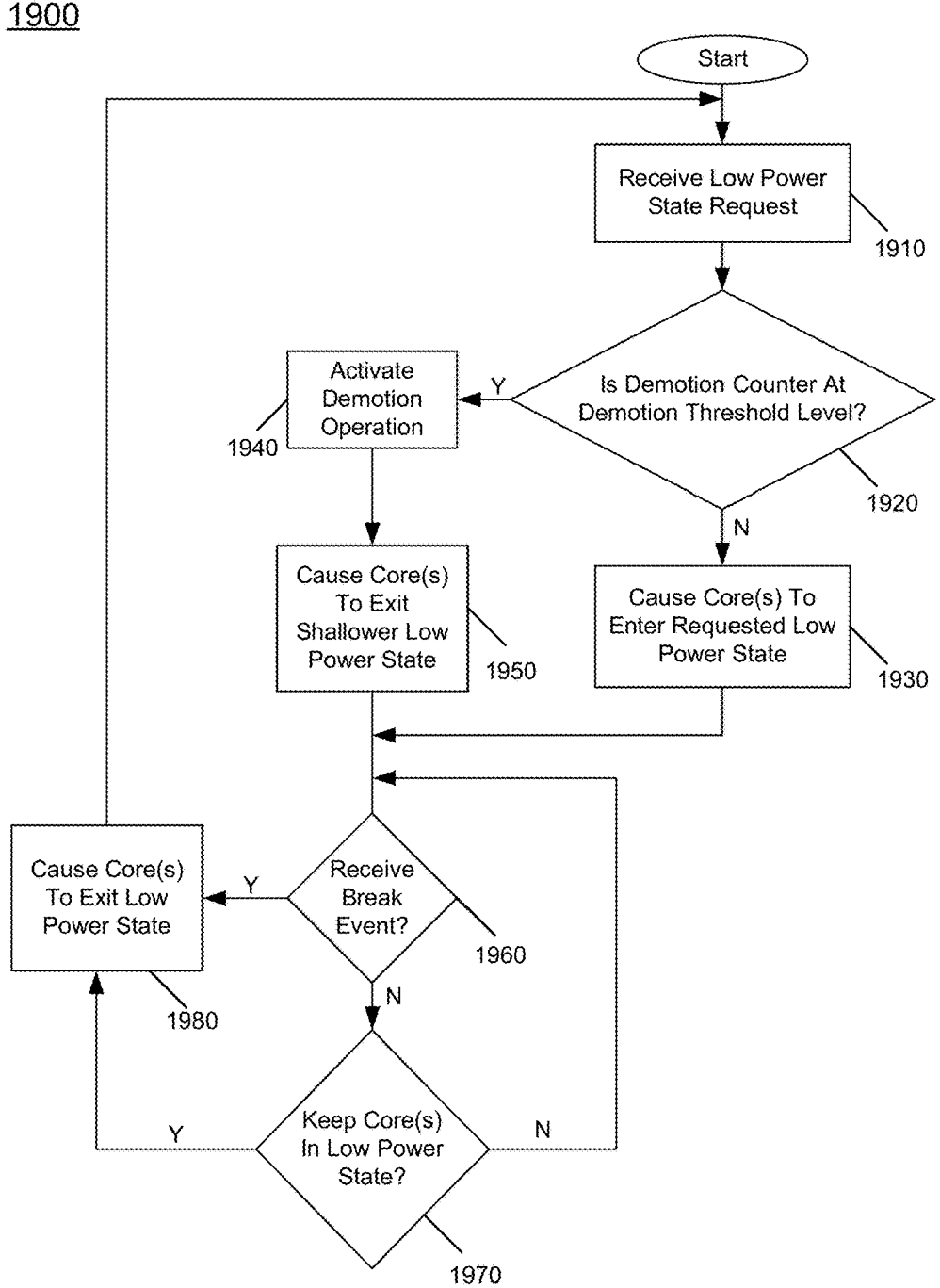
FIG. 19 is a flow diagram of a method in accordance with a still further embodiment of the present invention.

Referring now to FIG. 19, shown is a flow diagram of a method in accordance with a still further embodiment of the present invention. As shown in FIG. 19, method 1900, which may be performed by demotion power control circuitry of the power controller, may be used to control entry into demotion operation and handle low power state entry and exits. As illustrated, method 1900 begins by receiving a low power state request (block 1910). Assume that this low power state request is an OS request for a given C-state such as a given one of a core-level C6 or C7 state, as examples. Next it is determined whether a demotion counter (e.g., associated with the particular C-state requested) is at a demotion threshold level (diamond 1920). Note that this demotion threshold level may be a customer-provided demotion control parameter, to control aggressiveness of entry into a demotion operation. If the demotion counter is not at the demotion threshold level, control passes to block 1930 where one or more cores associated with the low power state request may be caused to enter into the requested low power state. For example, the PCU may send low power state control signals to the one or more cores to cause them to enter into this requested low power state, after taking appropriate low power state entry actions such as saving context in appropriate storage, disabling certain core circuitry and so forth.

Still with reference to FIG. 19, instead if it is determined that the demotion counter is at the demotion threshold level, control passes to block 1940 where demotion operation may be activated. To activate demotion operation, a demotion enable indicator may be set to indicate that demotion operation is active. As such, at block 1950 the demotion control circuitry may cause the one or more cores to enter a shallower low power state, e.g., due to the amount of incoming break events that the processor is receiving. As an example, assuming a requested low power state is a core-level C6 or C7 state, the demotion control circuitry may cause the one or more cores to enter into a shallower low power state, such as a C1 or C3 state.

Still referring to FIG. 19, from both of blocks 1930 and 1950 control passes to diamond 1960 to determine whether a break event is received while the one or more cores are in a low power state. If not, control passes to diamond 1970 to determine whether to keep such cores in the low power state. This determination may be based, e.g., on a duration value to indicate a length of time for the requested low power state. If it is determined to exit the low power state based on the determinations of one of diamonds 1960 and 1970, control passes to block 1980 where the one or more cores may be caused to exit the low power state and thus enter back into an active state, e.g., by re-establishing of context, enabling of various core circuitry and so forth. Understand while shown at this high level in the FIG. 19 embodiment, many variations and alternatives are possible.

Figure 20:
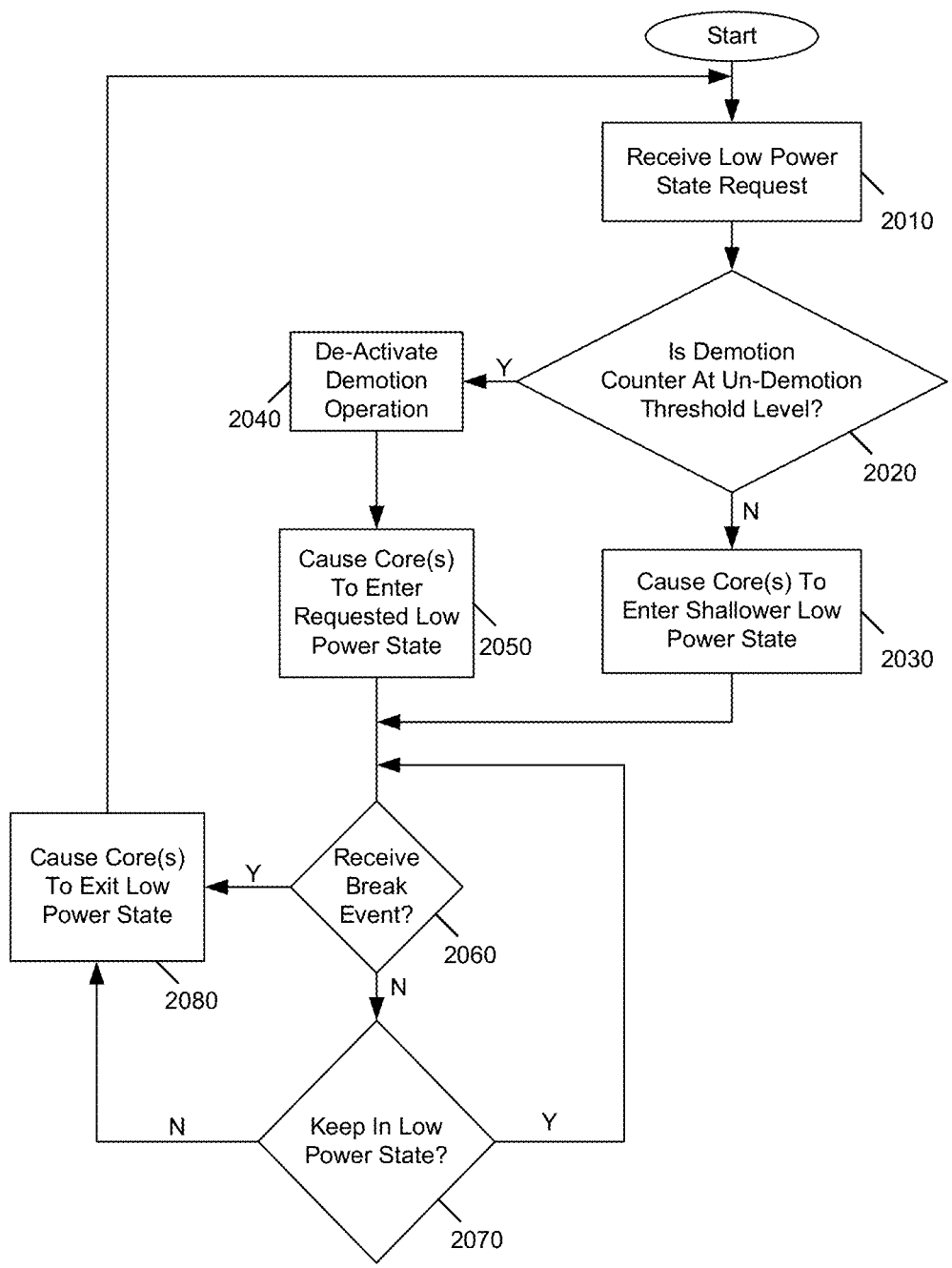
FIG. 20 is a flow diagram of a method in accordance with yet another embodiment of the present invention

Referring now to FIG. 20, shown is a flow diagram of a method in accordance with a still further embodiment of the present invention. As shown in FIG. 20, method 2000, which may be performed by demotion power control circuitry of the power controller, may be used to control exit from demotion operation and handle low power state entry and exits. As illustrated, method 2000 begins by receiving a low power state request (block 2010), e.g., an OS request for a given C-state. Next it is determined whether a demotion counter is at an un-demotion threshold level (diamond 2020). Note that this un-demotion threshold level may be a customer-provided demotion control parameter, in embodiments. If the demotion counter is not at the un-demotion threshold level (but continues to be above the demotion threshold level), control passes to block 2030 where one or more cores associated with the low power state request may be caused to enter into a shallower low power state, in this demotion operation state.

Still with reference to FIG. 20, instead if it is determined that the demotion counter is at the un-demotion threshold level, control passes to block 2040 where demotion operation may be de-activated, e.g., by resetting a demotion enable indicator. As such, at block 2050 the demotion control circuitry may cause the one or more cores to enter into the requested low power state. Then, from both of blocks 2030 and 2050 control passes to diamond 2060 to determine whether a break event is received while the one or more cores are in a low power state. If not, control passes to diamond 2070 to determine whether to keep such cores in the low power state. If it is determined to exit the low power state based on the determinations of one of diamonds 2060 and 2070, control passes to block 2080 where the one or more cores may be caused to exit the low power state and enter back into an active state. Understand while shown at this high level in the FIG. 20 embodiment, many variations and alternatives are possible.

Figure 21:
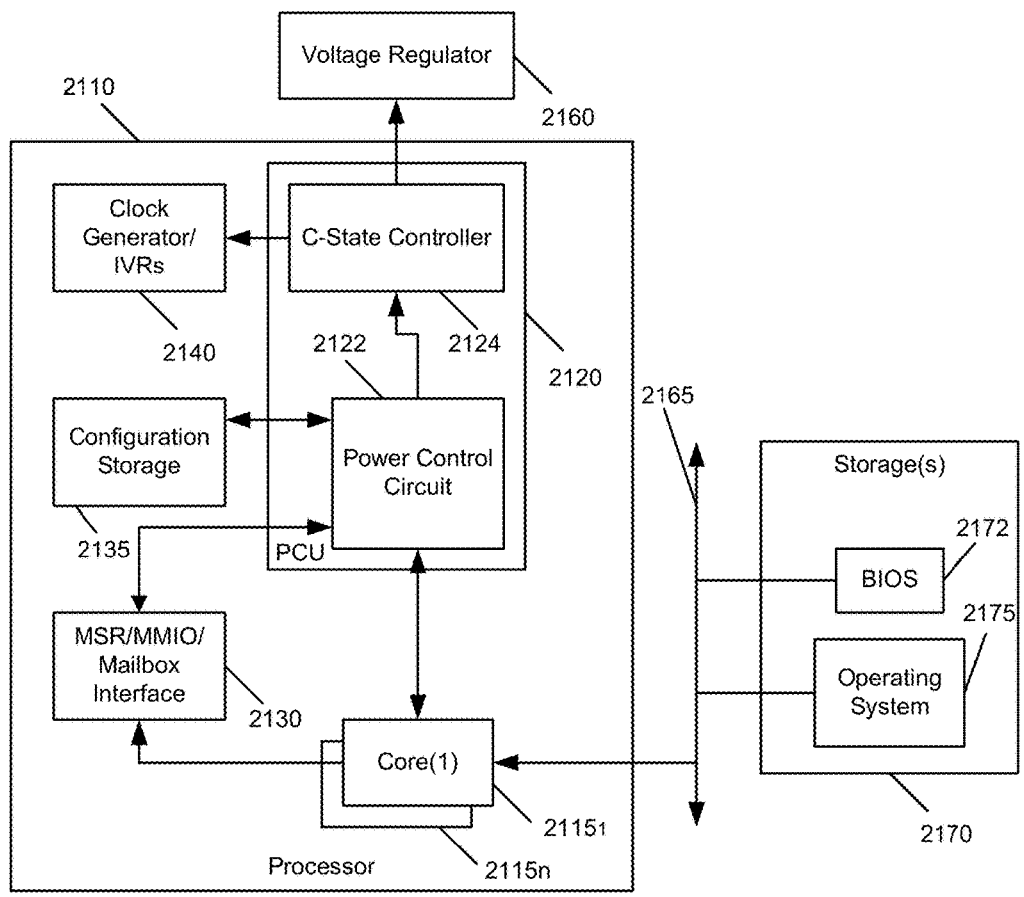
FIG. 21 is a block diagram of a system in accordance with an embodiment of the present invention.

Referring now to FIG. 21, shown is a block diagram of a system in accordance with an embodiment of the present invention. More specifically, a portion of a system 2100 is shown, including a processor 2110, which may be a multi-core processor or any other type of SoC, a voltage regulator 2160 coupled to provide one or more regulated voltages to processor 2110, and a storage 2170, which may be a system memory such as a DRAM.

As illustrated, to provide a customer interface to receive configuration information as described herein, namely demotion control parameter information, an interface 2165 couples processor 2110 to storage(s) 2170. Understand that interface 2165 may be any type of interconnect or other interface mechanism. As an example, portions of the interface may be internal to one or more of processor 2110 and storage(s) 2170. Still further, portions may be implemented, e.g., as traces or other interconnects on a circuit board that couples processor 2110 and storage(s) 2170 together.

As illustrated, processor 2110 includes multiple cores 2115$_1$-2115$_n$, each of which may be independently controlled to operate in one or more different P-states and/or C-states. To this end, cores 2115 (generically) couple to a power control unit 2120. In embodiments, PCU 2120 may perform various power management techniques, including autonomous demotion control of C-state requests received from an OS or other system software, as well as to enable receipt and use of customer-provided demotion control parameter information as described herein. In the embodiment shown, PCU 2120 includes a power control circuit 2122 which may perform various power management activities. Still further, PCU 2120 includes a C-state controller 2124 which, responsive to control information received from power control circuit 2120, may control active (and performance) states of different cores, e.g., by controlling one or more of clock generation and internal voltage regulator (IVR) circuitry (generically block 2140).

Still with reference to FIG. 21, processor 2110 further includes a configuration storage 2135, which may store a variety of configuration information for operation of the processor and power management operations, including the demotion control described herein. To this end, e.g., one or more of a BIOS 2172 and an OS 2175 may provide demotion control parameter information via interface 2165, for storage into configuration storage 2135.

In one embodiment, a generic mailbox interface may be implemented to enable receipt and delivery of this information into configuration storage 2135. More specifically as shown in FIG. 21, circuit 2130 may include one or more of MSRs/MMIOs and/or mailbox interface to enable receipt of this information and provision of the same to PCU 2120 to enable its storage and use as described herein. Understand while shown at this high level in the embodiment of FIG. 21, many variations and alternatives are possible.

Figure 22:
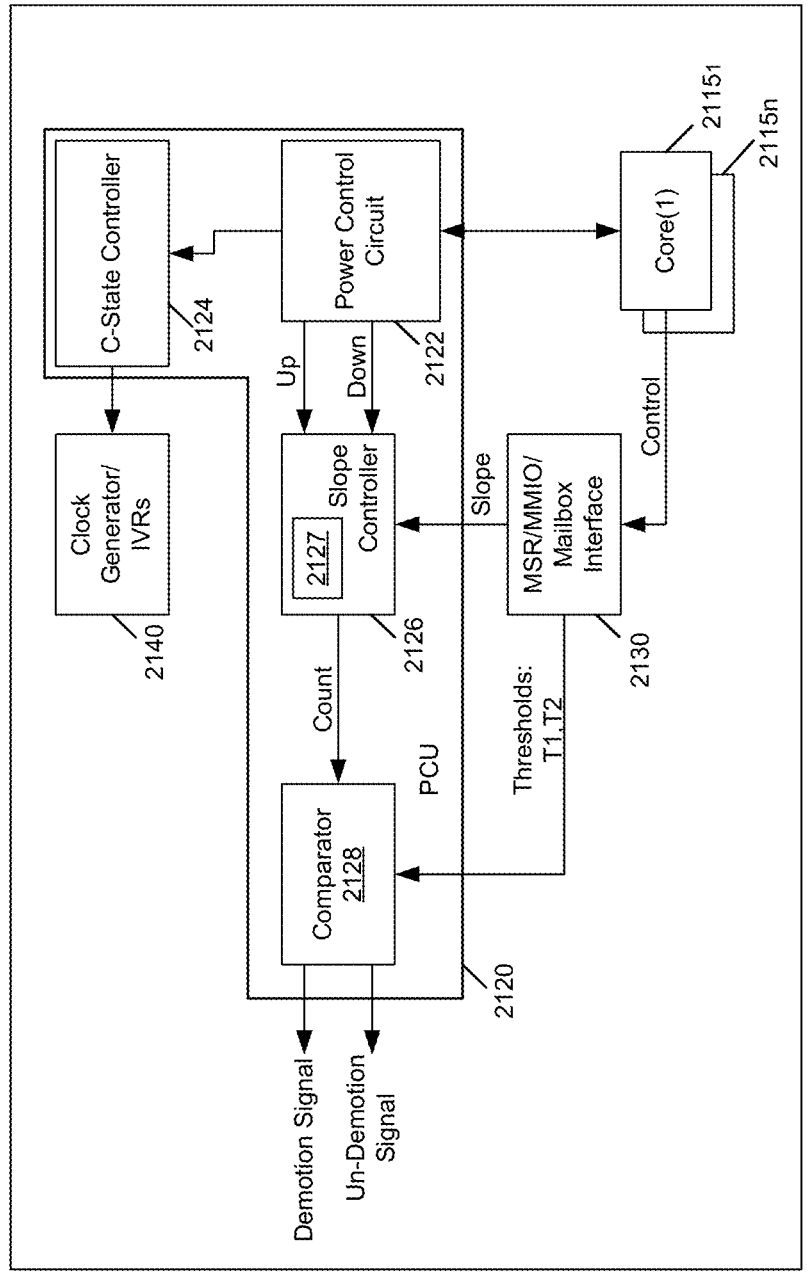
FIG. 22 is a block diagram of a portion of a processor in accordance with an embodiment of the present invention.

Referring now to FIG. 22, shown is a block diagram of a portion of a processor in accordance with an embodiment of the present invention. More specifically, processor 2100' shows further details regarding processor 2110 of FIG. 21. More specifically, FIG. 22 shows further details of PCU 2120. As further illustrated, PCU 2120 also includes a slope controller 2126 and a comparator 2128. In embodiments described herein, slope controller 2126 may receive demotion control parameter information corresponding to a slope parameter, to control aggressiveness of auto-demotion control.

As seen, slope controller 2126 receives control signals from power control circuit 2122, more specifically an "up" signal and a "down" signal. These signals may be provided by power control logic responsive to break events and/or low power state time durations to cause updating of a demotion counter (as shown herein, a set of demotion counters 2127 may be provided within slope controller 2126). To this end, when an up signal is received to indicate an increment update when a given time duration has occurred in a given C-state without receipt of a break event, slope controller 2126 may cause a count update to the corresponding demotion counter 2127 in the amount indicated by the slope parameter (namely an increment according to the slope parameter value). Instead, when a down signal is received responsive to a break event while the indicated core was in a low power state, slope controller 2126 may cause a count update to the corresponding demotion counter 2127 according to a constant value (e.g., a decrement of one).

As further illustrated in FIG. 22, threshold information may be provided via interface circuitry 2130 to comparator 2128. In turn, comparator 2128 may be configured to compare corresponding demotion counter values to these multiple thresholds, e.g., a demotion count threshold and an un-demotion count threshold. If a given demotion counter has a value greater than the corresponding demotion threshold, a demotion signal is output, which may be provided to power control circuit 2122 to indicate that a demotion operation is to be activated (such as by way of setting a control indicator). Instead when a value of a given demotion counter reaches the corresponding un-demotion counter threshold, an un-demotion occurs. Understand while shown at this high level in FIG. 22, many variations and alternatives are possible.

Figure 23:
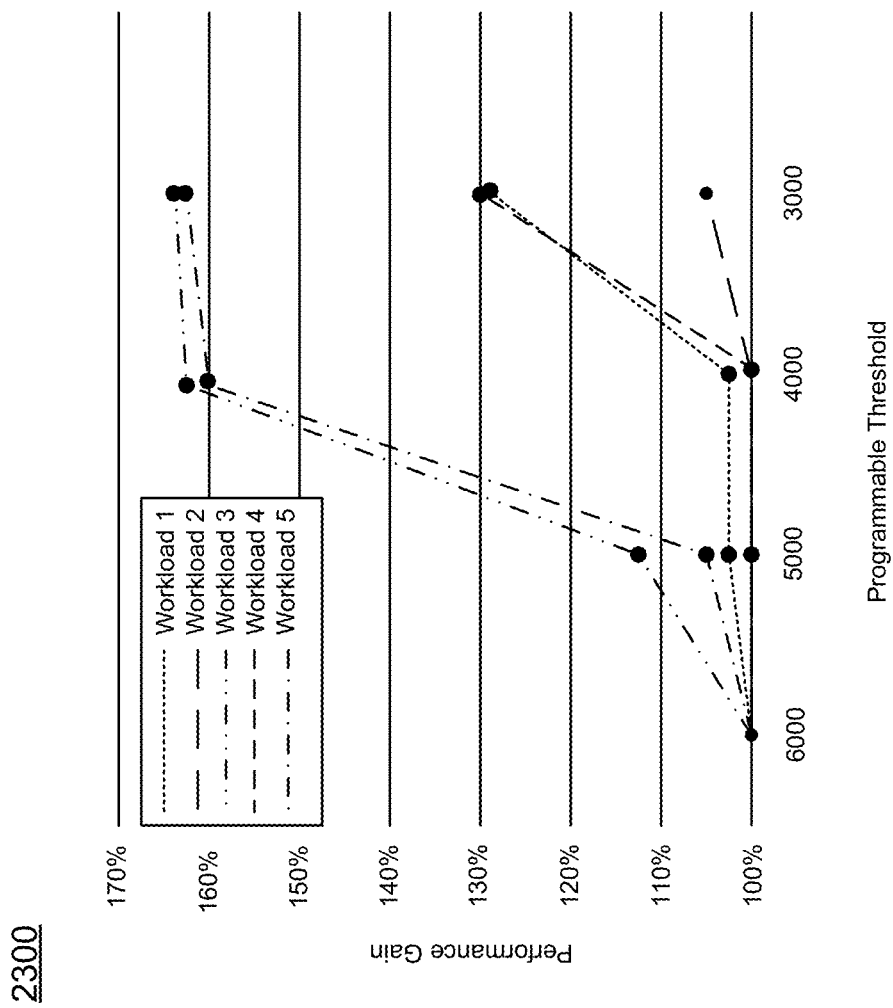
FIG. 23 is a performance diagram that indicates example performance gains for particular workloads in accordance with an embodiment of the present invention.

Referring now to FIG. 23, illustrated is a performance diagram 2300 that indicates example performance gains for particular workloads by providing customer-based demotion control parameter tuning enabled by the interface techniques described herein. As illustrated in FIG. 23, the Y-axis indicates performance gains as a programmable threshold is varied by way of customer tuning. Note that the programmable threshold values of the X-axis of diagram 2300 provide a measure of a slope parameter to a number of break events. Thus depending on workload and customer tuning of (at least) a slope configuration parameter, large performance gains can be realized by causing auto-demotion operation to be more aggressively enabled to cause the processor to be in shallower low power states, enabling reduced exit latencies, in turn increasing performance.

As seen in FIG. 23, up to 63% performance improvement on some workloads can be realized (or better put approximately a 60% less performance penalty for C-state entry). The increased runtime due to the performance improvement can translate up to 38% energy loss without an embodiment described herein.

Figure 24:
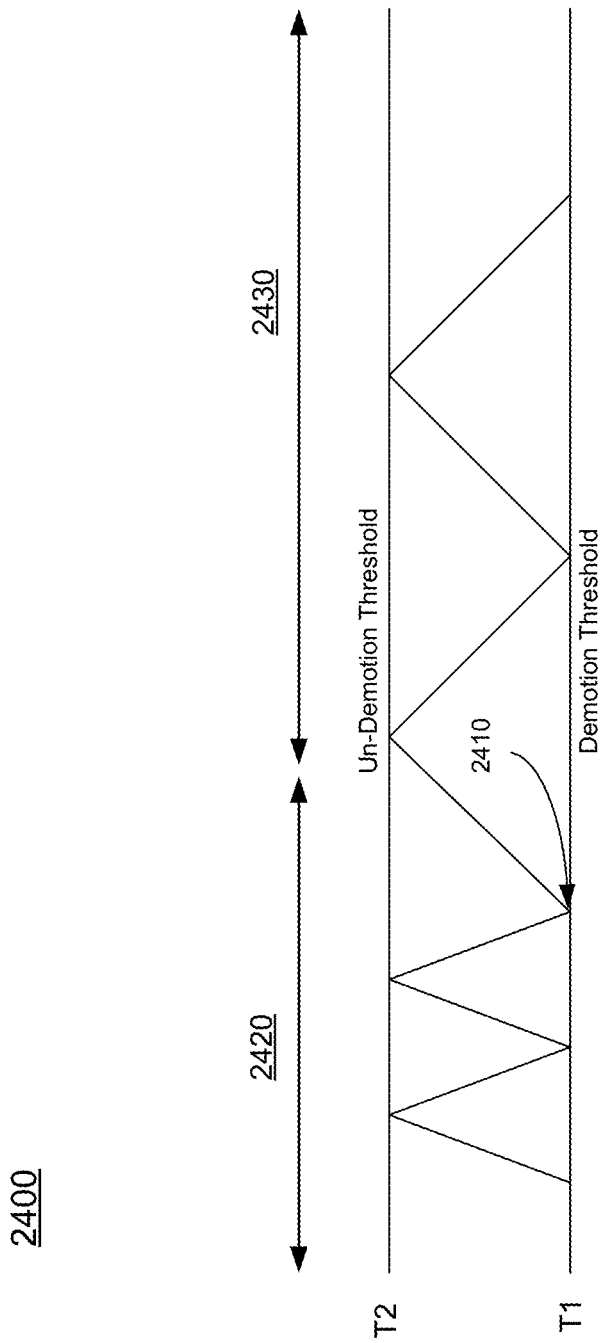
FIG. 24 is a timing diagram illustrating demotion and un-demotion thresholds in accordance with an embodiment of the present invention.

Referring now to FIG. 24, shown is a timing diagram 2400 illustrating demotion and un-demotion thresholds (respectively T1 and T2) on the Y-axis. In turn, the X-axis shows a dynamic update to a slope configuration parameter (illustrated at time instant 2410). As seen, during processor operation in window 2420 prior to this dynamic change to the slope value, un-demotion is aggressively applied, given a first value of the slope parameter. This rapid un-demotion after demotion operation is engaged (when the counter value exceeds T1) causes the processor to more readily enter into deeper low power states.

In contrast, after the slope change at time 2410, processor operation during window 2430 provides for much longer time periods to occur after a demotion counter exceeds the first threshold (T1) before un-demotion occurs (when such demotion counter reaches the un-demotion threshold T2). Of course other illustrations are possible. As shown in FIG. 24, when a less aggressive slope is set, slower event counts occur, resulting in less aggressive promotion/demotion. Embodiments thus enable better energy efficiency for OSVs and OEMs. Also using an embodiment, post-manufacture updates to demotion control parameters can occur. Embodiments may also better address customer-specific workloads such as servers and data centers with well-defined workload characteristics, and enable OEMs to permit a preference of user experience and tunings aimed at specific classes or applications.

The following Examples pertain to further embodiments.

In one example, a processor includes: a plurality of cores; a power controller including a logic to autonomously demote a request for at least one core of the plurality of cores to enter a first low power state, to cause the at least one core to enter a second low power state, the first low power state a deeper low power state than the second low power state; and an interface to receive an input from a system software, the input including at least one demotion control parameter, where the logic is to autonomously demote the request based at least in part on the at least one demotion control parameter.

In an example, the interface comprises at least one of a mailbox interface, a machine specific register, and a memory mapped input/output storage to receive the at least one demotion control parameter from the system software.

In an example, the system software comprises at least one of an operating system and a basic input/output system.

In an example, the system software is to provide a first value of the at least one demotion control parameter when a first workload is to execute on the at least one core and provide a second value of the at least one demotion control parameter when a second workload is to execute on the at least one core.

In an example, the at least one demotion control parameter comprises a slope parameter.

In an example, the logic is to cause the autonomous demotion based at least in part on a value of a demotion counter.

In an example, the logic is to update the demotion counter based at least in part on the slope parameter when the at least one core has been in a given low power state for a first time duration.

In an example, the logic is to further update the demotion counter responsive to a break event according to a different scale than the update responsive to the first time duration in the given low power state.

In an example, the at least one demotion control parameter comprises a demotion threshold.

In an example, the logic is to cause the autonomous demotion based on a comparison of the value of the demotion counter and the demotion threshold.

In an example, the power controller is to enable the at least one demotion control parameter to be stored in a configuration storage when the at least one demotion control parameter is received in a privileged mode.

In an example, the at least one demotion control parameter comprises a customer tuning for the autonomous demotion, the customer tuning different than a tuning for the autonomous demotion stored in a non-volatile storage of the processor by a manufacturer of the processor.

Note that the above processor can be implemented using various means.

In an example, the processor comprises a SoC incorporated in a user equipment touch-enabled device.

In another example, a system comprises a display and a memory, and includes the processor of one or more of the above examples In yet another example, a method includes: receiving, in a power control logic of a processor via an interface, at least one demotion control parameter from a system software, the at least one demotion control parameter comprising a tuning for autonomous demotion of a low power state request; storing the at least one demotion control parameter in a storage associated with the power control logic; and causing at least one core of the processor to enter into a first low power state, based at least in part on the at least one demotion control parameter, the first low power state different than a requested low power state.

In an example, the method further comprises: updating a counter based on a number of break events when the at least one core is in the first low power state; and updating the counter based on one or more time durations in which the at least one core is in the first low power state.

In an example, the method further comprises: updating the counter based on the one or more time durations according to a slope parameter corresponding to the at least one demotion control parameter; and updating the counter based on the number of break events according to a constant value.

In an example, the method further comprises: comparing a value of the counter to a first threshold; causing the at least one core to enter into the requested low power state based on a first result of the comparison; and causing the at least one core to enter into the first low power state based on a second result of the comparison.

In an example, the method further comprises: receiving the at least one demotion control parameter with a first control value when a first workload is executing on the processor; and receiving the at least one demotion control parameter with a second control value when a second workload is executing on the processor.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a processor having a plurality of cores and a power controller to receive a tuning for at least one demotion control parameter via an interface with a system software, where the power controller is to cause at least one core of the plurality of cores to enter a first low power state responsive to a request for a second low power state, the second low power state a deeper low power state than the first low power state, based at least in part on the at least one demotion control parameter; a voltage regulator to provide at least one voltage to the processor, where the power controller is to control a level of the at least one voltage; and a storage to store the system software, where the system software includes configuration information comprising the at least one demotion control parameter.

In an example, the interface comprises at least one of a mailbox interface, a machine specific register, and a memory mapped input/output storage to receive the at least one demotion control parameter from the system software, where the tuning comprises a customer tuning to control aggressiveness of autonomous override of system software low power state requests.

In an example, the power controller is to autonomously override a system software low power state request based at least in part on a value of a counter, where the counter is to be updated in a first direction based at least in part on the at least one demotion control parameter when the at least one core has been in the second low power state for a first time duration and to be updated in a second direction responsive to a break event according to a different scale than the first direction update.

In yet another example, an apparatus includes: a plurality of core means for executing instructions; first means for autonomously demoting a request for at least one core means of the plurality of core means to enter a first low power state, to cause the at least one core means to enter a second low power state, the first low power state a deeper low power state than the second low power state; and interface means for receiving an input from a system software, the input including at least one demotion control parameter, where the first means is to autonomously demote the request based at least in part on the at least one demotion control parameter.

In an example, the interface means comprises at least one of a mailbox interface, a machine specific register, and a memory mapped input/output storage to receive the at least one demotion control parameter from the system software.

In an example, the system software is to provide a first value of the at least one demotion control parameter when a first workload is to execute on the at least one core means and provide a second value of the at least one demotion control parameter when a second workload is to execute on the at least one core means.

In an example, the first means is to cause the autonomous demotion based at least in part on a value of a demotion counter, the demotion counter to be updated in a first direction based at least in part on a slope parameter when the at least one core means has been in a given low power state for a first time duration and to be updated in a second direction responsive to a break event according to a different scale than the update responsive to the first time duration in the given low power state.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A processor comprising:
a plurality of cores;
a power controller including a logic to autonomously demote a request for at least one core of the plurality of cores to enter a first low power state, to cause the at least one core to enter a second low power state, the first low power state a deeper low power state than the second low power state; and an interface to receive an input from a system software, the input including at least one demotion control parameter separate from the request, wherein the logic is to autonomously demote the request based at least in part on the at least one demotion control parameter, and the system software is to provide a first value of the at least one demotion control parameter when a first workload is to execute on the at least one core and provide a second value of the at least one demotion control parameter when a second workload is to execute on the at least one core.

2. The processor of claim 1, wherein the interface comprises at least one of a mailbox interface, a machine specific register, and a memory mapped input/output storage to receive the at least one demotion control parameter from the system software.

3. The processor of claim 1, wherein the system software comprises at least one of an operating system and a basic input/output system.

4. The processor of claim 1, wherein the at least one demotion control parameter comprises a slope parameter.

5. The processor of claim 4, wherein the logic is to cause the autonomous demotion based at least in part on a value of a demotion counter.

6. The processor of claim 5, wherein the logic is to update the demotion counter based at least in part on the slope parameter when the at least one core has been in a given low power state for a first time duration.

7. The processor of claim 6, wherein the logic is to further update the demotion counter responsive to a break event according to a different scale than the update responsive to the first time duration in the given low power state.

8. The processor of claim 5, wherein the at least one demotion control parameter comprises a demotion threshold.

9. The processor of claim 8, wherein the logic is to cause the autonomous demotion based on a comparison of the value of the demotion counter and the demotion threshold.

10. The processor of claim 1, wherein the power controller is to enable the at least one demotion control parameter to be stored in a configuration storage when the at least one demotion control parameter is received in a privileged mode.

11. The processor of claim 1, wherein the at least one demotion control parameter comprises a customer tuning for the autonomous demotion, the customer tuning different than a tuning for the autonomous demotion stored in a non-volatile storage of the processor by a manufacturer of the processor.

12. A non-transitory machine-readable medium having stored thereon instructions, which if performed by a machine cause the machine to perform a method comprising:
receiving, in a power control logic of a processor via an interface, at least one demotion control parameter from a system software, the at least one demotion control parameter comprising a tuning for autonomous demotion of a low power state request, the at least one demotion control parameter having a first control value when a first workload is executing on the processor and having a second control value when a second workload is executing on the processor;
storing the at least one demotion control parameter in a storage associated with the power control logic; and
causing at least one core of the processor to enter into a first low power state, based at least in part on the at least one demotion control parameter, the first low power state different than a requested low power state.

13. The non-transitory machine-readable medium of claim 12, wherein the method further comprises:
updating a counter based on a number of break events when the at least one core is in the first low power state; and
updating the counter based on one or more time durations in which the at least one core is in the first low power state.

14. The non-transitory machine-readable medium of claim 13, wherein the method further comprises:
updating the counter based on the one or more time durations according to a slope parameter corresponding to the at least one demotion control parameter; and
updating the counter based on the number of break events according to a constant value.

15. The non-transitory machine-readable medium of claim 13, wherein the method further comprises:
comparing a value of the counter to a first threshold;
causing the at least one core to enter into the requested low power state based on a first result of the comparison; and
causing the at least one core to enter into the first low power state based on a second result of the comparison.

16. A system comprising:
a processor having a plurality of cores and a power controller to receive a tuning for at least one demotion control parameter via an interface with a system software, wherein the power controller is to cause at least one core of the plurality of cores to enter a first low power state responsive to a request for a second low power state, the second low power state a deeper low power state than the first low power state, based at least in part on the at least one demotion control parameter, the tuning for the at least one demotion control parameter separate from the request for the second low power state, and wherein the system software is to provide a first value of the at least one demotion control parameter when a first workload is to execute on the at least one core and provide a second value of the at least one demotion control parameter when a second workload is to execute on the at least one core;
a voltage regulator to provide at least one voltage to the processor, wherein the power controller is to control a level of the at least one voltage; and
a storage to store the system software, wherein the system software includes configuration information comprising the at least one demotion control parameter.

17. The system of claim 16, wherein the interface comprises at least one of a mailbox interface, a machine specific register, and a memory mapped input/output storage to receive the at least one demotion control parameter from the system software, wherein the tuning comprises a customer tuning to control aggressiveness of autonomous override of system software low power state requests.

18. The system of claim 16, wherein the power controller is to autonomously override a system software low power state request based at least in part on a value of a counter, wherein the counter is to be updated in a first direction based at least in part on the at least one demotion control parameter when the at least one core has been in the second low power state for a first time duration and to be updated in a second direction responsive to a break event according to a different scale than the first direction update.

* * * * *